United States Patent
Rupe et al.

(10) Patent No.: US 11,947,403 B1
(45) Date of Patent: Apr. 2, 2024

(54) SYSTEMS AND METHODS FOR OPERATING A TERMINATION DEVICE OF AN ACCESS COMMUNICATION NETWORK

(71) Applicant: Cable Television Laboratories, Inc., Louisville, CO (US)

(72) Inventors: Jason W. Rupe, Lafayette, CO (US); Douglas D. Jones, Boulder, CO (US); Stephen L. Burroughs, Longmont, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/812,117

(22) Filed: Jul. 12, 2022

Related U.S. Application Data

(60) Provisional application No. 63/220,609, filed on Jul. 12, 2021.

(51) Int. Cl.
| | | |
|---|---|---|
| *G06F 1/00* | (2006.01) | |
| *G06F 1/3209* | (2019.01) | |
| *G06F 1/3246* | (2019.01) | |
| *H04L 12/40* | (2006.01) | |
| *G06F 1/3203* | (2019.01) | |
| *H04L 12/64* | (2006.01) | |

(52) U.S. Cl.
CPC .......... *G06F 1/3209* (2013.01); *G06F 1/3246* (2013.01); *H04L 12/40039* (2013.01); *G06F 1/3203* (2013.01); *H04L 12/6418* (2013.01); *H04L 2012/6421* (2013.01); *H04L 2012/6478* (2013.01)

(58) Field of Classification Search
CPC .............. G06F 1/3209; G06F 1/3246; H04L 12/40039; H04L 12/6418; H04L 2012/6421; H04L 2012/6478
USPC .......................................................... 713/323
See application file for complete search history.

(56) References Cited

U.S. PATENT DOCUMENTS

| | | | | |
|---|---|---|---|---|
| 6,513,123 | B2 * | 1/2003 | Muraki ................. | G06F 1/3203 |
| | | | | 713/323 |
| 10,756,917 | B2 * | 8/2020 | Zehler .................... | H04W 76/10 |
| 10,944,634 | B1 * | 3/2021 | Beeson ............... | H04L 43/0894 |
| 11,245,799 | B2 * | 2/2022 | Ebner ................. | H04N 1/00315 |
| 2008/0080458 | A1 * | 4/2008 | Cole ..................... | H04W 48/18 |
| | | | | 370/342 |
| 2016/0094701 | A1 * | 3/2016 | Hund .................... | H04W 12/06 |
| | | | | 455/420 |
| 2018/0217955 | A1 * | 8/2018 | Ito .......................... | H04L 27/14 |
| 2018/0324562 | A1 * | 11/2018 | Park ....................... | H04W 4/16 |
| 2020/0245357 | A1 * | 7/2020 | Cui .................... | H04W 74/0808 |
| 2020/0280973 | A1 * | 9/2020 | Tang ..................... | H04L 1/1822 |
| 2021/0211764 | A1 * | 7/2021 | Jeyachandran ........ | H04H 60/40 |
| 2022/0086939 | A1 * | 3/2022 | Qiao .................. | H04W 40/246 |
| 2022/0410407 | A1 * | 12/2022 | Matsumoto .......... | B25J 15/0433 |

(Continued)

*Primary Examiner* — Volvick Derose
(74) *Attorney, Agent, or Firm* — PdZ Patent Law, PLLC

(57) ABSTRACT

A method for operating a termination device of an access communication network includes (a) performing, at the termination device, a first start-up procedure, (b) after performing the first start-up procedure, detecting, at the termination device, presence of a communication signal meeting one or more predetermined criteria, and (c) in response to detecting presence of the communication signal meeting the one or more predetermined criteria, performing, at the termination device, a second start-up procedure that is different from the first start-up procedure.

16 Claims, 16 Drawing Sheets

(56) References Cited

U.S. PATENT DOCUMENTS

| | | | | |
|---|---|---|---|---|
| 2023/0082991 A1* | 3/2023 | Sowards | ............ | A61B 1/00048 606/1 |
| 2023/0116571 A1* | 4/2023 | Shelton, IV | ........... | A61B 18/14 606/130 |

* cited by examiner

SYSTEMS AND METHODS FOR OPERATING A TERMINATION DEVICE OF AN ACCESS COMMUNICATION NETWORK

CROSS REFERENCE TO RELATED APPLICATIONS

This application claims the benefit of priority to U.S. Provisional Patent Application No. 63/220,609, filed on Jul. 12, 2021, which is incorporated herein by reference.

BACKGROUND

Access communication networks are used to provide communication services to subscribers. For example, access communication networks are widely used to provide voice, data, and/or video communication services to residential subscribers and to business subscribers. Access communication networks are also increasingly being used to provide backhaul communication services to wireless base stations. Examples of access communication networks include, but are not limited to, data over cable service interface specification (DOCSIS) networks, digital subscriber line (DSL) networks, ethernet passive optical network (EPON) networks, radio frequency over glass (RFOG or RFoG) networks, gigabit passive optical network (GPON) networks, satellite wireless access networks, and cellular wireless access networks.

An access communication network typically includes termination devices at subscribers' locations, to interface communication devices at the subscribers' locations with the access communication network. For example, each location served by an access communication network may have a termination device at the location to serve one or more subscribers at the location. Examples of termination devices include, but are not limited to, cable modems, DSL modems, cellular wireless modems, satellite wireless modems, optical network terminals (ONTs), and optical network units (ONUs). A termination device and local area network (LAN) controller are frequently combined to form a network gateway.

DETAILED DESCRIPTION OF THE EMBODIMENTS

A termination device was traditionally installed at a subscriber's location by a professional technician, such as a technician affiliated with an operator of an access communication network. Professional installation, though, may not be necessary at locations which are already configured to receive service from an access communication network, such as a building where a previous occupant subscribed to service from the access communication network. Additionally, professional installation may be expensive and may inconvenience a subscriber by requiring that the subscriber be present at their premises during an installation scheduling window. Consequentially, termination devices are now frequently "self-installed," i.e., termination devices are frequently installed by subscribers, instead of by professional technicians. For example, a subscriber wishing to obtain communication service from an access communication service provider may (a) obtain a termination device from the communication service provider, such as by mail or by visiting the provider's store, (b) connect the termination device to a communication jack at the subscriber's premises, e.g., an electrical or optical communication wall jack at the subscriber's premises, (c) connect the termination device to a power source, e.g., an electrical outlet at the subscriber's premises, and (d) wait for the termination device to start-up, or to "boot," so that the termination device is ready to serve the subscriber.

Figure 1:
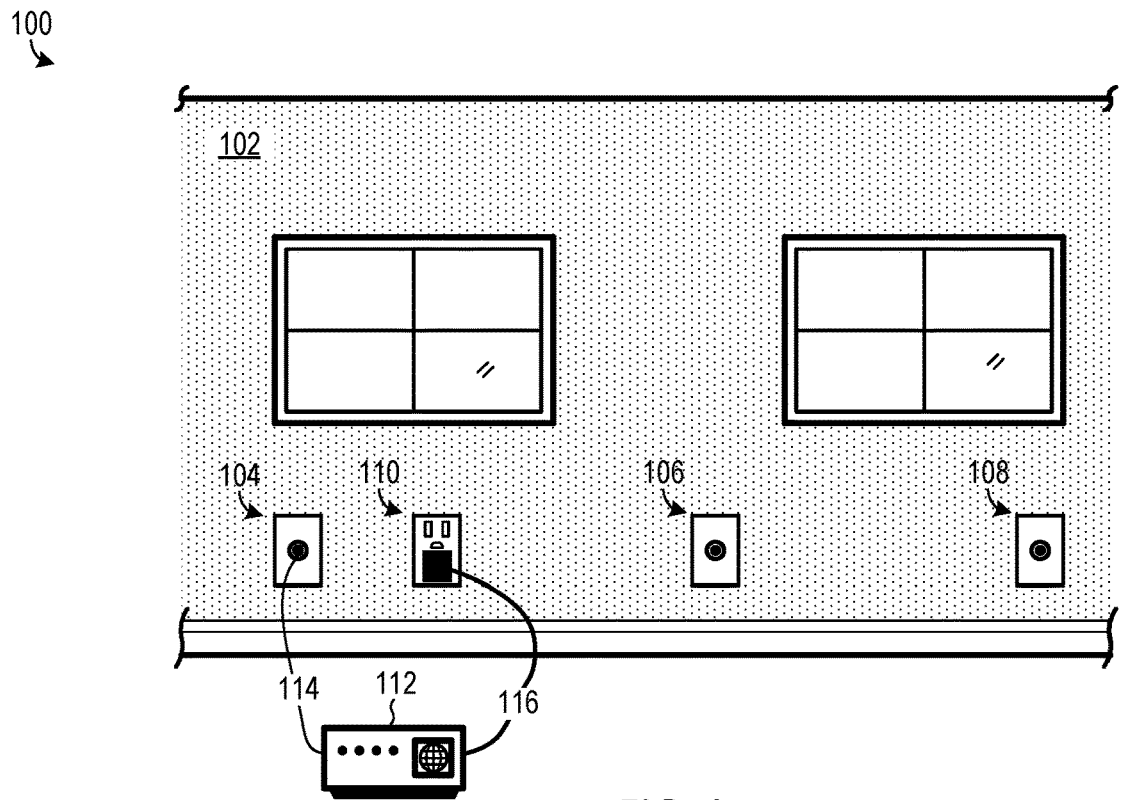
FIG. 1 illustrates an example of self-installation of a wireline termination device.

Unfortunately, self-installation often fails due to lack of communication signals from the access communication network at the installation location. For example, FIG. 1 illustrates a portion of a subscriber's home 100 including a wall 102 with three communication wall jacks 104, 106, and 108 and an electrical outlet 110. Each wall jack 104, 106, and 108 includes, for example, a coaxial electrical cable jack, a twisted-pair electrical cable jack, or an optical cable jack. FIG. 1 illustrates an example self-installation of a wireline termination device 112 where a subscriber (not shown) is attempting to perform self-installation of termination device 112 by (a) connecting termination device 112 to wall jack 104 via a communication cable 114 (e.g., a coaxial electrical cable, a twisted pair electrical cable, or an optical cable) and (b) connecting termination device 112 to electrical outlet 110 via an electrical cord 116. However, wall jack 104 may not be operable, i.e., it may not provide adequate access communication signals for termination device 112 to operate.

For example, wall jack 104 may have never been connected to an access communication network, or a cable or other infrastructure connecting wall jack 104 to the access communication network may have become degraded, may have been disconnected, or may have failed. As such, termination device 112 may fail to start-up due to lack of a communication signal from the access communication network at wall jack 104, causing the self-installation procedure to fail. In such case, the subscriber may have to try the self-installation procedure again by disconnecting termination device 112 from wall jack 104 and subsequently connecting termination device 112 to either wall jack 106 or wall jack 108, in hopes that one or more of wall jacks 106 and 108 is operable, i.e., one or more of wall jacks 106 and 108 provides adequate access communication signals for termination device 112 to operate. Additionally, it may turn out that none of wall jacks 104, 106, or 108 are operable, potentially resulting in the subscriber attempting self-installation of termination device 112 multiple times without success.

Figure 2:
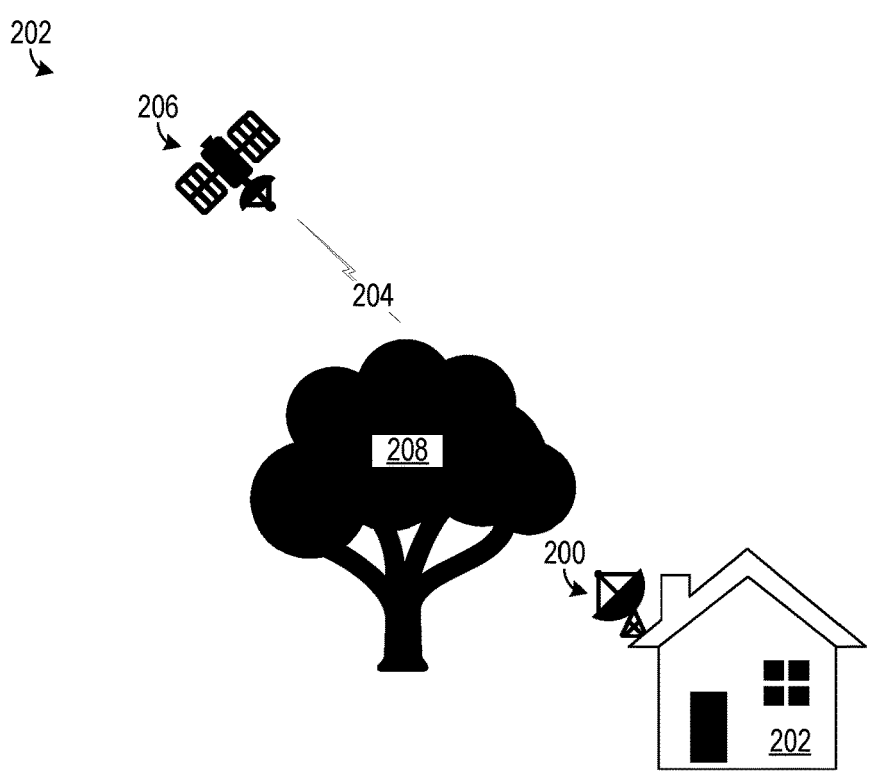
FIG. 2 illustrates an example of self-installation of a wireless termination device.

FIG. 2 illustrates an example of self-installation of a satellite wireless termination device 200 on an exterior of a subscriber's home 202. Satellite wireless termination device 200 needs to receive communication signals 204 from a satellite 206 to start-up and serve a subscriber. However, an obstacle such as a tree 208 blocks transmission of communication signals between satellite 206 and satellite termination device 200 device, and satellite wireless termination device 200 will therefore fail to establish a connection, causing the self-installation procedure to fail. It should be noted that the location of satellite 206 relative to the subscriber's home 202 may not be known to the subscriber and/or may be in motion (e.g., a non-geostationary satellite), and it therefore may not be obvious to the subscriber where the satellite termination device 200 may best be located to receive adequate communication signals from satellite 206. As such, the self-installation procedure illustrated in FIG. 2 may require significant trial and error by the subscriber to find a suitable location for satellite wireless termination device 200.

A subscriber may be significantly inconvenienced by failure of a termination device self-installation procedure. For example, conventional termination devices check for presence of an adequate access communication signal near the end of the start-up procedure, and the start-up procedure may take significant time (e.g., 1.5 to 2 minutes or more). As such, a subscriber may have to wait significant time after beginning a self-installation procedure to determine whether the self-installation procedure will succeed. As another example, a subscriber searching for a location with an adequate communication signal for a termination device, e.g., a location with an operable wall jack or a location with an unobstructed wireless signal, may have to connect and disconnect the termination device from an electrical outlet multiple times during the search process. Additionally, a subscriber attempting self-installation of a conventional termination device may have to wait for professional installation of the termination device before receiving service should self-installation options be exhausted without success.

Disclosed herein are systems and methods for operating a termination device of an access communication network which may at least partially overcome the above discussed drawbacks of conventional termination devices and their operating methods. Certain embodiments of the new systems and methods are configured to check for presence of an adequate access communication signal early in the start-up procedure, instead of towards the end of the start-up procedure. As such, the new systems and methods may quickly identify lack of an adequate access communication signal, thereby preventing a subscriber attempting self-installation from having to wait for a significant time to find out that self-installation procedure has failed. Stated differently, in particular embodiments of the new systems and methods, if self-installation is going to fail, the failure will happen quickly, thereby helping prevent the subscriber from wasting time on waiting for a start-up procedure that will ultimately fail. Additionally, some embodiments of the new termination devices include an energy storage subsystem configured to power the termination device, e.g. during start-up, provisioning, or initialization, without requiring that the termination device be connected to an external electrical power source, thereby helping minimize subscriber inconvenience associated with plugging in and unplugging the termination device when searching for a suitable installation location. Furthermore, certain embodiments of the new termination devices are configured to communicate with external network resources via a secondary communication interface in event of difficulties with a first communication interface, such as to facilitate troubleshooting of the first communication interface or to provide temporary communication service to the subscriber via the second communication interface. Accordingly, the new termination devices and associated operating methods may significantly advance termination device installation, both by subscribers and professional technicians.

Figure 3:
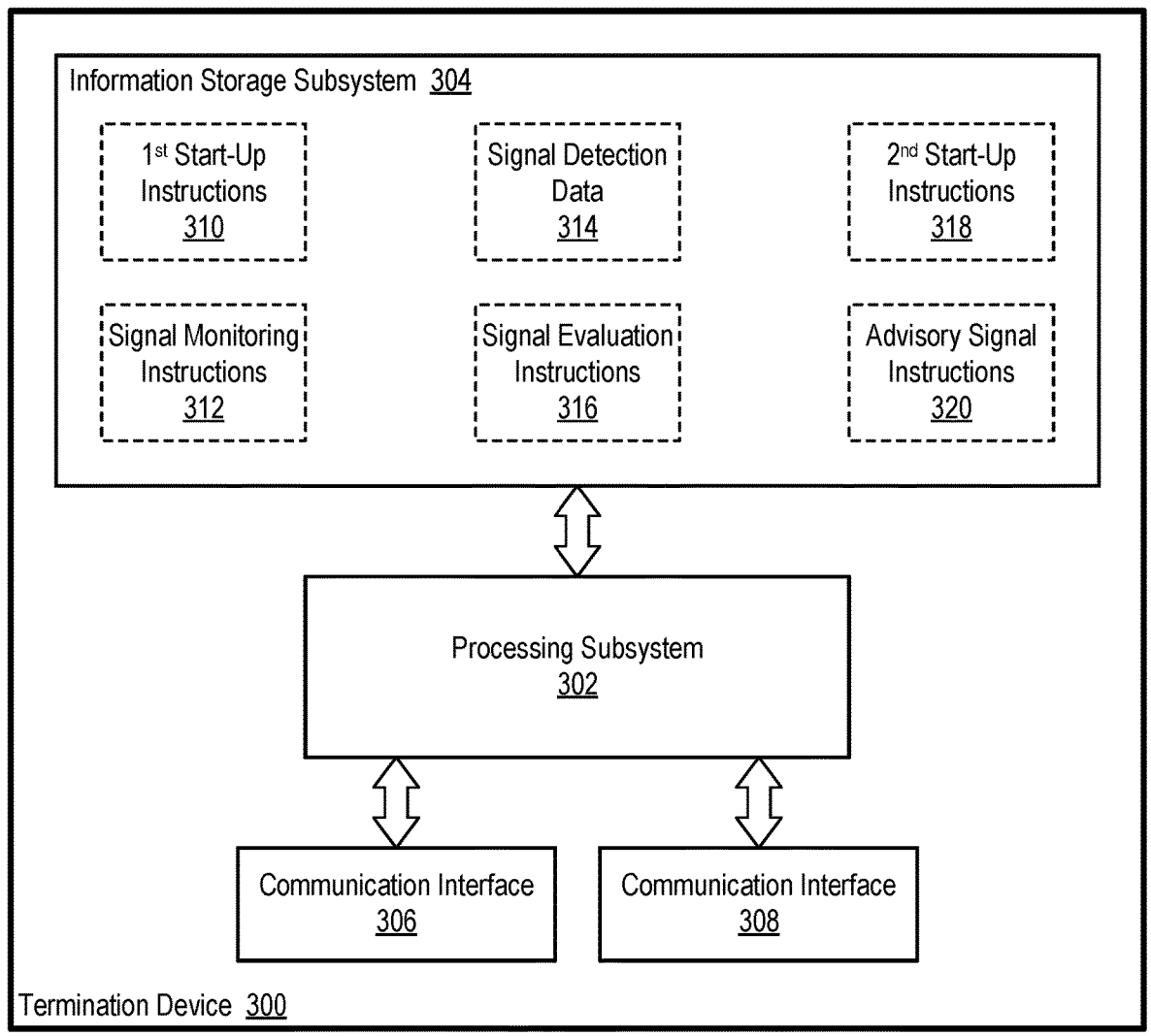
FIG. 3 is a block diagram of a termination device configured to determine presence of an adequate access communication signal early in a start-up procedure of the termination device, according to an embodiment.

FIG. 3 is a block diagram of a termination device 300, which may be one example of or generic to termination device 112, including an embodiment of the new systems disclosed herein. As discussed further below, termination device 300 is configured to determine presence of an adequate access communication signal early in a start-up procedure of the termination device, which may advantageously prevent a subscriber from wasting time waiting for the start-up procedure to hopefully complete in situations where the start-up procedure will ultimately fail. Termination device 300 includes a processing subsystem 302, an information storage subsystem 304, a communication interface 306, and a communication interface 308. Communication interface 306 is configured to communicatively couple termination device 300 to an access communication network. For example, in some embodiments, communication interface 306 is configured to communicatively couple termination device 300 to an access communication network, e.g., operating according to a data over cable service interface specification (DOCSIS) protocol, and any variations, improvements, and/or evolutions thereof, such that termination device 300 is a cable modem. In some other embodiments, communication interface 306 is configured to communicatively couple termination device 300 to a digital subscriber line (DSL) access communication network, such that termination device 300 is a DSL modem. In yet other embodiments, communication interface 306 is configured to communicatively couple termination device 300 to an optical access communication network, e.g., operating according to an Ethernet passive optical network (EPON) protocol, a radio frequency of over glass (RFOG or RFoG) protocol, a Gigabit-capable passive optical network (GPON) protocol, a coherent passive optical network (CPON) (point-to-point, point-to-multipoint, cascaded, etc.), and any variations, improvements, and/or evolutions thereof, such that termination device 300 is an optical network terminal (ONT) or an optical network unit (ONU).

In yet other embodiments, communication interface 306 is configured to communicatively couple termination device 300 to a wireless access communication network instead of a wireline access communication network. For example, in certain embodiments, communication interface 306 is configured to communicatively couple termination device 300 to a cellular wireless access communication network, e.g., operating according to either a $3^{rd}$ Generation Partnership Project (3GPP) protocol (such as a long term evolution (LTE) protocol, a fifth generation (5G) protocol, a sixth generation (6G) protocol, and any variations, improvements, and/or evolutions thereof) or a non-3GPP protocol, such that termination device 300 is a cellular wireless modem. As another example, in some other embodiments, communication interface 306 is configured to communicatively couple termination device 300 to a satellite wireless access communication network, e.g., a very low earth orbit (VLEO) satellite access communication network, a low earth orbit (LEO) satellite access communication network, a medium earth orbit (MEO) satellite access communication network, or a geostationary equatorial orbit (GEO) satellite access communication, and any variations, improvements, and/or evolutions thereof, such that termination device 300 is a satellite wireless modem. Communication interface 306 could also be configured to communicatively couple termination device 300 to one or more future developed access communication networks. As other examples, in some other embodiments, communication interface 306 is configured to communicatively couple termination device 300 to a converged communication network which combines two or more of the above embodiments into a wired-wireless converged communication network, wired-wired converged communication network, or wireless-wireless converged communication network.

Communication interface 308 is configured to communicatively couple termination device 300 with one or more communication devices at a subscriber's location, so that termination device 300 can communicatively interface the communication devices with an access communication network. In some embodiments, communication interface 308 is an electrical communication interface, such as an Ethernet electrical communication interface, a home networking protocol electrical communication interface, or a Universal Serial Bus (USB) electrical communication interface. As another example, in certain embodiments, communication interface 308 is an optical communication interface. As an additional example, in some embodiments, communication interface 306 is a wireless communication interface, such as a wireless communication interface configured to operate according to a Wi-Fi wireless communication protocol (e.g., an Institute of Electrical and Electronics Engineers (IEEE) 802.11-based wireless communication protocol), a Bluetooth wireless communication protocol, a long range (LoRa) wireless communication protocol, and/or a Zigbee wireless communication protocol. Examples of possible communication devices that may be communicatively coupled to termination device 300 via communication interface 308 include, but are not limited to, a mobile telephone, a computer, a set-top device, a data storage device, an Internet of Things (IoT) device, an entertainment device, a computer networking device, a smartwatch, a wearable device with wireless capability, a medical device, a security device, a monitoring device, and a wireless access device (including, for example, an eNB, a gNB, a Wi-Fi-based wireless access point, an integrated access and backhaul (IAB) access point, a microcell, a picocell, a femtocell, a macrocell, a Wi-Fi-based application, a satellite communication device, etc.). Communication interface 308 could also be configured to communicatively couple termination device 308 to one or more future developed communication devices. Furthermore, communication interface 308 could be configured to communicatively couple termination device 300 to one or more communication device using one or more future developed communication technologies or one or more future developed communication protocols.

Processing subsystem 302 is communicatively coupled to each of information storage subsystem 304, communication interface 306, and communication interface 308. Processing subsystem 304 is configured to control at least some aspects of operation of termination device 300 at least partially by executing instructions, such as in the form of firmware and/or software, stored in information storage subsystem 304. In some embodiments, processing subsystem 302 includes one or more processors, such as one or more microprocessors. Processing subsystem 302 could be at least partially embodied by a distributed computing system, such as a cloud computing system.

Information storage subsystem 304 is configured to store instructions, such as in the form software and/or firmware, as well as data, for use by processing subsystem 302. While information storage subsystem 304 is depicted in FIG. 3 as being a single element, information storage subsystem 304 could be formed of two or more sub-elements, such as memory modules and/or hard drives, without departing from the scope hereof. Information storage subsystem 304 could be at least partially embodied by a distributed storage system, such as a cloud storage system. Information storage subsystem 304 is illustrated as storing the following instructions and data (discussed below), although the actual contents of information storage subsystem 304 may vary according to its implementation and/or its operating conditions: (a) first start-up instructions 310, (b) signal monitoring instructions 312, (c) signal detection data 314, (d) signal evaluation instructions 316, (e) second start-up instructions 318, and (f) advisory signal instructions 320.

Processing subsystem 302 and information storage subsystem 304 collectively form one embodiment of the new systems for operating a termination device. Processing subsystem 302 and information storage subsystem 304 are collectively configured to check for presence of an adequate access communication signal at communication interface 306 early in a start-up procedure of termination device 300. As such, processing subsystem 302 and information storage subsystem 304 may advantageously quickly identify lack of an adequate access communication signal at communication interface 306. While not required, it is anticipated that processing subsystem 302 and information storage subsystem 304 will typically be configured to collectively perform one or more additional functions of termination device 300, such as modulation of signals, demodulation of signals, encoding of signals, decoding of signals, encryption of data, and/or decryption of data.

Termination device 300 may include additional elements without departing from the scope hereof. For example, some alternate embodiments of termination device 300 include one or more communication interfaces in addition to communication interfaces 306 and 308, such as to enable termination device 300 to communicate with communication devices at a subscriber's location using two or more different communication technologies, such as both wired and wireless communication technologies and/or multiple types of wireless communication technologies (e.g., two or more of 5G NR-U, Wi-Fi, and Bluetooth). As another example, certain alternate embodiments of termination device 300 include a LAN controller to enable the termination device to control a LAN including communication devices at the subscriber's location. Furthermore, processing subsystem 302 and information storage subsystem 304 could be partially or completely replaced with other circuitry, such as discrete or integrated analog and/or digital electronic circuitry, which performs the same functions as processing subsystem 302 and information storage subsystem 304.

Figure 4:
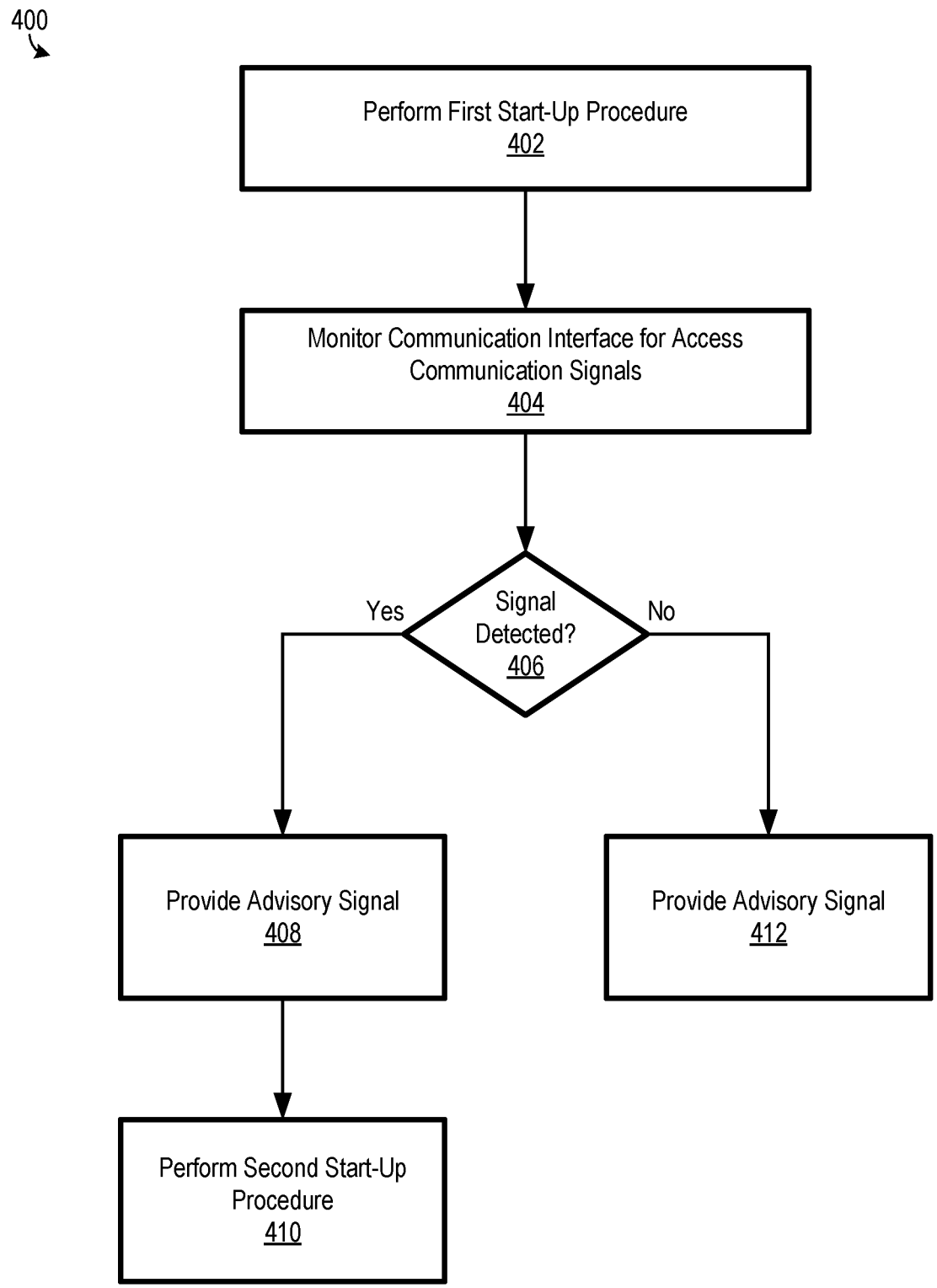
FIG. 4 is a flow chart of a method for operating a termination device of an access communication network, according to an embodiment.

FIG. 4 is flow chart of a method 400 for operating a termination device of an access communication network, which one embodiment of the new methods disclosed herein. While method 400 is primarily discussed below with respect to termination device 300, method 400 is not limited to use with termination device 300. Additionally, termination device 300 is not limited to operating according to method 400.

In a block 402 of method 400, the termination device performs a first start-up procedure. In one example of block 402, processing subsystem 302 executes first start-up instructions 310 stored in information storage subsystem 304 to perform a first start-up procedure of termination device 300. Importantly, the first start-up procedure of block 402 is not a full start-up procedure of the termination device. Instead, the first start-up procedure is a partial start-up procedure that need only be sufficient to enable the termination device to detect presence of an adequate communication signal from an access communication network and to advise a subscriber (or other party) whether an adequate communication signal was detected. In particular embodiments, performance of the first start-up procedure advantageously requires relatively little time which enables the termination device to quickly determine whether there is presence of an adequate access communication signal at the termination device.

Accordingly, in some embodiments, block 402 includes loading a portion of the termination device's operating system that is unencrypted, or loading a small portion of an encrypted operating system that can be quickly decrypted, so that block 402 can be quickly executed. Additionally, in certain embodiments, the first start-up procedure of block 402 omits one or more of the following start-up steps, which are optionally included in a second start-up procedure of block 410 (discussed below): verifying termination device basic input/output system (BIOS) code, initializing termination device busses, initialing termination device integrated circuits, verifying termination device memory, running test vectors, performing operating system decryption, performing operating system verification, and establishing security. The termination device optionally stores data generated during execution of the first start-up procedure of block 402, such as for use during the second start-up procedure of block 410. In certain embodiments, the first start-up procedure of block 402 includes establishing one or more communication functions, such as a Bluetooth wireless communication function and/or a Wi-Fi communication function, to enable the termination device to communicate with user equipment in the vicinity of the termination device, before the termination device has completely started-up.

In a block 404 of method 400, the termination device monitors a communication interface for presence of communication signals. In one example of block 404, processing subsystem 302 executes signal monitoring instructions 312 to monitor communication interface 306 for presence of communication signals from an access communication network, and processing subsystem 302 stores information on any such detected communication signals as signal detection data 314 in information storage subsystem 304. The monitoring performed in block 404 includes, for example, detection of communication signals in the electrical domain or in the optical domain, such as downlink signals from an access communication network. Although block 404 is depicted in FIG. 4 as being after block 402, block 404 may be executed concurrently with block 402, or block 404 may be integrated with block 402. For example, in some embodiments, block 404 is performed as a first slot or as a second slot of the block 402 start-up procedure.

In a decision block 406, the termination device determines whether a communication signal meeting one or more predetermined criteria was detected in block 404. In one example of block 406, processing subsystem 302 executes signal evaluation instructions 316 to determine whether one or more detected signals, which are represented by signal detection data 314, meet one or more predetermined criteria. The predetermined criteria of block 406 are selected, for example, (a) to help distinguish a communication signal of an access communication network from a signal from another source, such as noise ingress, and/or (b) to help ensure that a detected signal from an access communication network has a sufficiently high signal integrity to support reliable operation of the termination device. For instance, in particular embodiments, the predetermined criteria includes one or more of (a) a detected signal having one or more predetermined frequency characteristics, (b) a detected signal having one or more predetermined amplitude characteristics, (c) a detected signal having one or more predetermined modulation characteristics, (d) a detected signal having one or more predetermined stability characteristics, (e) a detected signal having one or more predetermined communication protocol characteristics, (f) a detected signal representing one or more predetermined items of information, (g) a detected signal having a predetermined or determinable pattern, (h) a detected signal having one or more predetermined distortion characteristics, (i) a detected signal having one or more predetermined harmonic content characteristics, (j) a detected signal having a predetermined phase, and (k) a detected signal being decodable to yield predetermined data, such as an expected sequence of data. In some embodiments, the termination device is configured to execute decision block 406 at least partially by decoding a signal, determining a pattern of a signal, demodulating a signal, digitizing an analog signal, determining signal magnitude, determining signal phase, determining signal frequency, and/or performing Fourier analysis, or a similar analysis, of a signal. Although block 406 is depicted in FIG. 4 as being after block 404, block 406 may be performed concurrently with block 404, block 406 may be integrated with block 404, or all of blocks 402, 404, and 406 may be integrated.

If the result of decision block 406 is yes, i.e., presence of a communication signal meeting the one or more predetermined criteria was detected, method 400 proceeds to a block 408 where the termination device provides an advisory signal to the subscriber (or other party installing the termination device) advising that an operable access communication signal was detected by the termination device. The advisory signal includes, for example, changing a state of an indicator of the termination device (e.g., changing state of a light, a digital display, a speaker, etc. of the termination device) and/or sending a signal to user equipment (e.g., a mobile telephone, a computer, a television, a smart watch, etc.) in the vicinity of the termination device. The termination device sends a signal to user equipment, for example, via a Bluetooth wireless communication signal, a Wi-Fi wireless communication signal, a Zigbee wireless communication signal, and/or an electrical or optical cable. In some embodiments, the termination device sends an advisory signal to user equipment in protocol-agnostic manner, such that the signal does not necessarily comply with a communication protocol. For example, the termination device may send a signal in either a processed form (e.g., after analog-to-digital conversion) or in pre-processed form (e.g., before analog-to-digital conversion) to user equipment, and the user equipment can process the signal for compatibility with its respective operating environment, such as by translating the signal from a raw form to a signal that complies with a particular communication protocol. The user equipment may also forward the advisory signal in raw or translated form to another device. Furthermore, the user equipment may send a response to the termination device, such as to confirm receipt of the advisory signal or to request that the termination device perform an action, such as that the termination device perform a test.

Method 400 proceeds from block 408 to block 410 where the termination device performs a second start-up procedure that is different from the first start-up procedure of block 402. In one example of block 410, processing subsystem 302 executes second start-up instructions 318 to perform a second start-up procedure of termination device 300. In some embodiments, the second start-up procedure of block 410 is a complete start-up procedure, i.e., it includes all steps required to completely start-up the termination device, including steps that may have already been performed in the first start-up procedure of block 402. In some other embodiments, the second start-up procedure of block 410 builds on the first start-up procedure performed in block 402. For example, the second start-up procedure may be at least partially based on data stored by the termination device during the first start-up procedure, such as data representing a downlink access communication signal detected in block 404 and identified in block 406. The second start-up procedure may include start-up steps that were not included in the first start-up procedure, such as security steps that were not included in the first start-up procedure, one or more operating system loading steps that were not included in the first start-up procedure, testing steps that were not included in the first start-up procedure, operating system image verification steps that were not included in the first start-up procedure, and/or operating system decryption steps that were not included in the first start-up procedure. In some embodiments, the second start-up procedure of block 410 requires more time to perform than the first start-up procedure of block 402, such as due to the first start-up procedure being designed to be quickly completed. In some embodiments, one or both of the first start-up procedure of block 402 and the second start-up procedure of block 410 includes partially or completely provisioning the termination device.

Furthermore, certain embodiments of method 400 continue to operate the termination device at least partially according to the first start-up procedure of block 402 while performing the second start-up procedure of block 410, such as to enable the termination device to at least partially function while performing the second start-up procedure. For example, in particular embodiments of method 400, the first start-up procedure of block 402 establishes a low-bandwidth communication link with the access communication network (assuming a sufficient access communication signal is present), and method 400 maintains the low-bandwidth communication link while performing the second start-up procedure of block 410 until a high-bandwidth communication link is established by the second start-up procedure.

Referring again to decision block 406, if the result of the decision block is no, i.e., presence of a communication signal meeting the one or more predetermined criteria was not detected, method 400 proceeds to a block 412 where the termination device provides a signal to the subscriber (or other party installing the termination device) advising that an operable access communication signal was not detected by the termination device, thereby informing the subscriber that installation has failed. Similar to block 408, the advisory signal includes, for example, changing a state of an indicator of the termination device (e.g., changing a state of a light, a digital display, a speaker, etc. of the termination device) and/or sending a signal to user equipment (e.g., a mobile telephone, a computer, a television, a smart watch, etc.) in the vicinity of the termination device. The termination device sends a signal to user equipment, for example, via a Bluetooth wireless communication signal, a Wi-Fi wireless communication signal, a Zigbee wireless communication signal, and/or an electrical or optical cable. In some embodiments, the termination device sends an advisory signal to user equipment in protocol-agnostic manner, such that the signal does not necessarily comply with a communication protocol. For example, the termination device may send a signal in either a processed form (e.g., after analog-to-digital conversion) or in pre-processed form (e.g., before analog-to-digital conversion) to user equipment, and the user equipment can process the signal for compatibility with its respective operating environment, such as by translating the signal from a raw form to a signal that complies with a particular communication protocol. The user equipment may also forward the advisory signal in raw or translated form to another device. Furthermore, the user equipment may send a response to the termination device, such as to confirm receipt of the advisory signal or to request that the termination device perform an action, such as that the termination device perform a test.

Some embodiments of method 400 are further configured to repeat execution of blocks 402-406 one or more times in response to the result of decision block 406 being no, before proceeding from decision block 406 to block 412. As such, in these embodiments, method 400 performs one or more retries before concluding that there is lack of an operable access communication signal at the termination device. Additionally, some embodiments method 400 execute a different implementation of block 402, 404, and/or 406 during a second or subsequent execution of the block(s), to try a different approach for detecting an operable access communication signal at the termination device. For example, a different start-up procedure may be used during a second execution of block 402, such as to start-up the termination device in a low power mode, in a high reliability mode, in a low bandwidth mode, etc., to increase likelihood that the termination device will detect an operable access communication signal. As another example, method 400 may execute different instructions, such as more robust instructions, for detecting presence of an access communication signal when executing block 404 for a second time. As additional example, method 400 may use a different predetermined criteria when executing decision block 406 for a second time.

In some cases, the result of decision block 406 may be inconclusive. Certain embodiments of method 400 are configured to repeat execution of blocks 402-406 one or more times in such case, to attempt to conclusively determine the result of decision block 406. Additionally, some embodiments of method 400 are configured to execute a different implementation of block 402, 404, and/or 406 during a second or subsequent execution of the block(s), such as in a manner similar to that discussed above in the context of the result of decision block 406 being no.

Method 400 is performed, for example, each time the termination device is started-up or only when the termination device is started-up for a first time. In some embodiments, the termination device is configured such that method 400 can be performed on demand, such by causing the termination device to enter a test mode which starts execution of method 400.

Method 400 could be modified to omit block 408 such that method 400 proceeds from decision block 406 directly to block 410 if the result of decision block 406 is yes. Additionally, method 400 could be modified to include additional blocks. For example, an alternate embodiment of method 400 includes an additional block (not shown) between decision block 406 and block 408, where the termination device confirms that it can successfully transmit an uplink communication signal to an access communication network, before proceeding to blocks 408 and 410. As another example, method 400 could be modified to include one or more additional blocks, such as troubleshooting blocks, that are executed in response to the result of decision block 406 being no.

Figure 5:
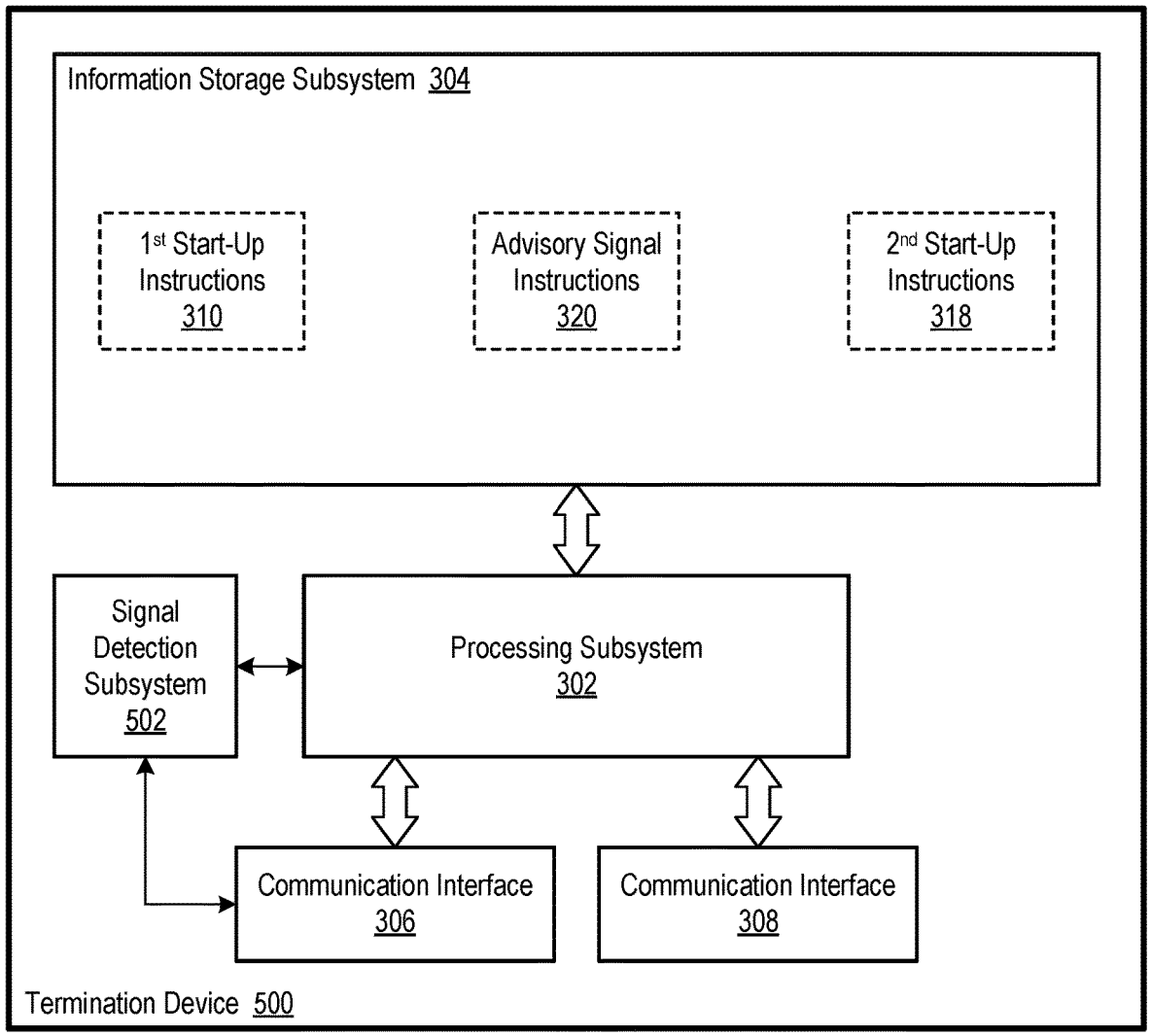
FIG. 5 is a block diagram of an alternate embodiment of the FIG. 3 termination device further including a signal detection subsystem.

Referring again to FIG. 3, termination device 300 is configured such that processing subsystem 302 and information storage subsystem 304 collectively detect presence of an adequate communication signal from an access communication network, as discussed above. However, termination system 300 could be modified to include one or more additional elements that are dedicated to signal detection, instead of relying on processing subsystem 302 and information storage subsystem 304 for such function. For example, FIG. 5 is a block diagram of a termination device 500, which is an alternate embodiment of termination device 300 of FIG. 3 further including a signal detection subsystem 502 communicatively coupled to each of communication interface 306 and processing subsystem 302. Signal detection subsystem 502 is configured to determine whether a communication signal meeting one or more predetermined criteria has been detected at communication interface 306. For instance, in some embodiments, signal detection subsystem 502 is configured to perform the functions of blocks 404 and 406 of method 400. Use of signal detection subsystem 502 in place of processing subsystem 302 and information storage subsystem 304 for signal detection may achieve additional flexibility. Signal monitoring instructions 312, signal detection data 314, and signal evaluation instructions 316 are omitted from information storage subsystem 304 in termination device 500 in view of presence of signal detection subsystem 502.

Figure 6:
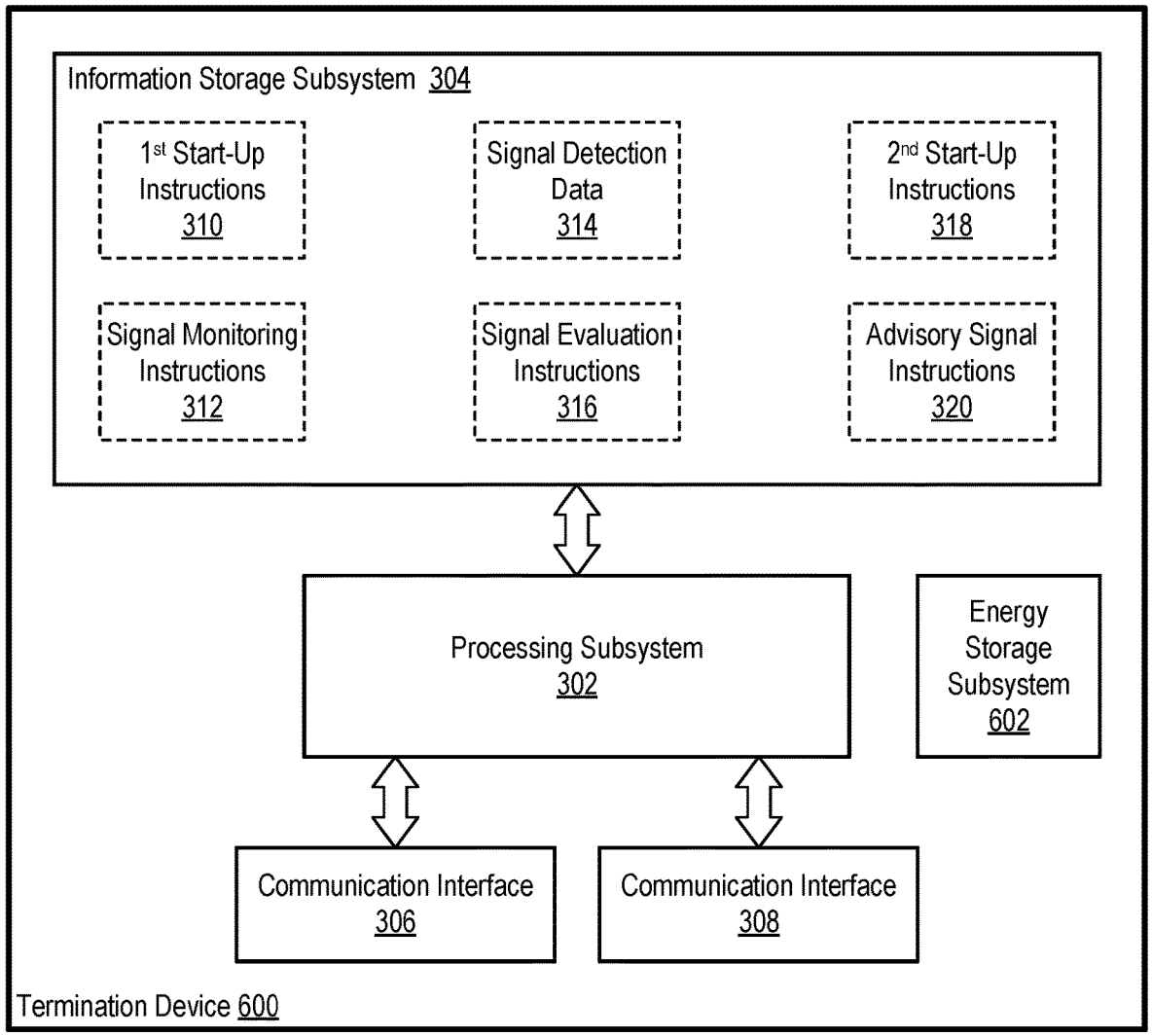
FIG. 6 is a block diagram of an alternate embodiment of the FIG. 3 termination device further including an energy storage subsystem.

Any of the termination devices disclosed herein could further include an internal energy storage subsystem configured to power the termination device while searching for presence of an adequate access communication signal, such as to enable an installer to test installation locations for presence of an adequate access signal without requiring that the termination device be connected to an electrical outlet. For example, FIG. 6 is a block diagram of a termination device 600, which is an alternate embodiment of termination device 300 further including an energy storage subsystem 602 configured to power termination device 600 at least while performing a first start-up procedure and while determining whether an adequate access communication signal is available at communication interface 306. Some embodiments of energy storage subsystem 602 are further configured to temporarily power termination device 600 during a power failure, such as to enable termination device 600 to send a signal to an access communication network advising of the power failure. Energy storage subsystem 602 includes, for example, an electrostatic energy storage device (e.g., a capacitor), a chemical energy storage device (e.g., a battery), a magnetic energy storage device (e.g., an inductor), and/or a mechanical energy storage device (e.g., a flywheel).

Figure 7:
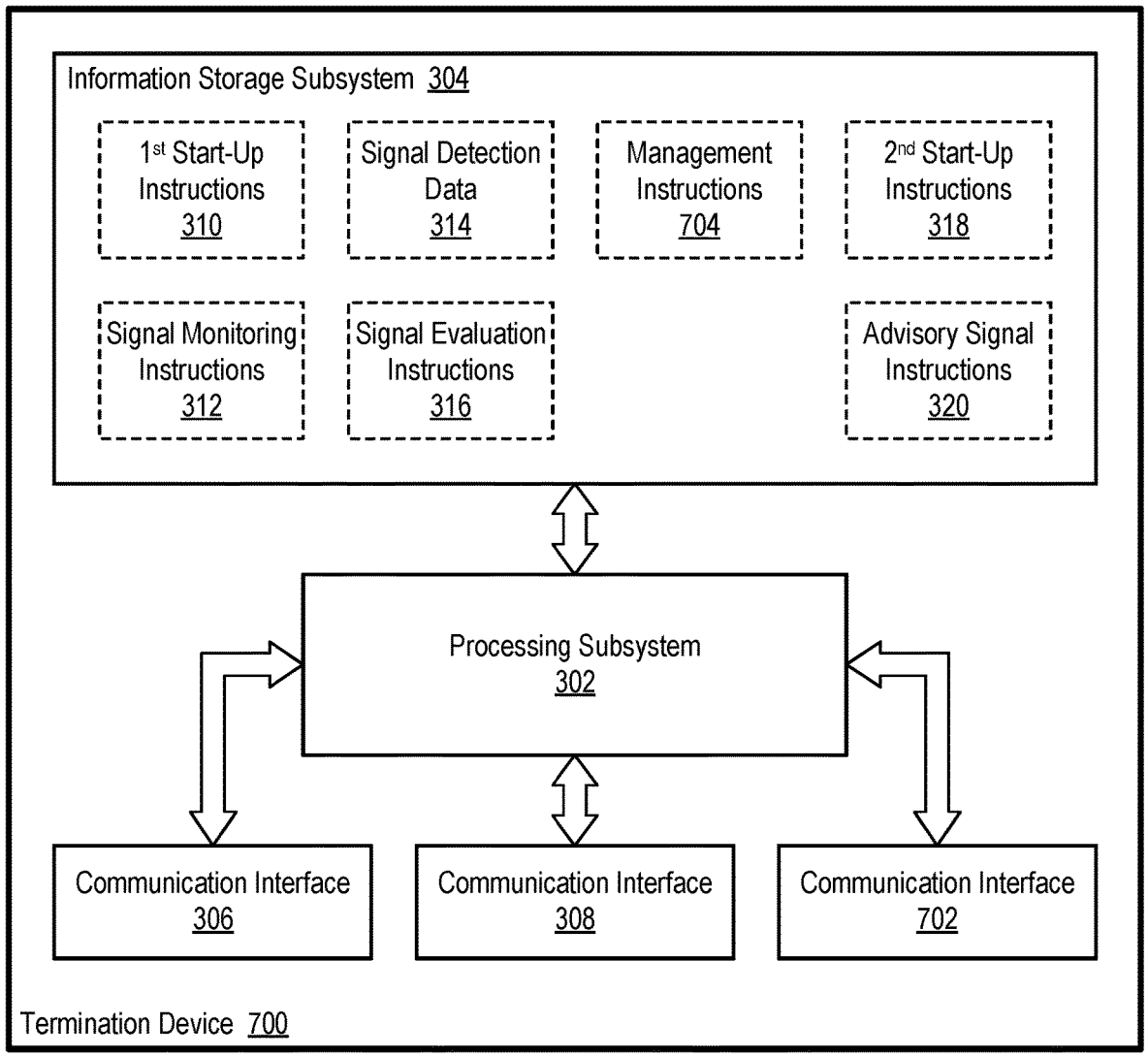
FIG. 7 is a block diagram of alternate embodiment of the FIG. 3 termination device including an additional communication interface.

Referring again to FIG. 3, as discussed above, termination device 300 could be modified to include additional communication interfaces. As one example, FIG. 7 is a block diagram of a termination device 700 further including a communication interface 702 analogous to communication interface 308. In certain embodiments, each of communication interfaces 308 and 702 is configured to interface communication devices at the location of termination device 700 with an access communication network. In some embodiments, communication interfaces 308 and 702 operate according to different communication technologies. For example, communication interface 308 may be a wired communication interface (e.g., configured to operate according to an ethernet communication protocol, a home networking communication protocol, or a USB communication protocol), and communication interface 702 may be a wireless communication interface (e.g., configured to operate according to a Wi-Fi communication protocol, a Bluetooth communication protocol, a LoRa communication protocol, or a Zigbee communication protocol). Termination device 700 could be modified to include one or more additional communication interfaces without departing from the scope hereof.

FIG. 7 depicts optional management instructions 704 stored in information storage subsystem 304. In particular embodiments, processing subsystem 302 is configured to execute management instructions 704 to instantiate a management entity, such as for controlling operating system image installation, establishing an alternative communication channel, performing data collection, performing troubleshooting, and/or performing termination device configuration. Examples of a few possible applications of the management entity are discussed below.

Figure 8:
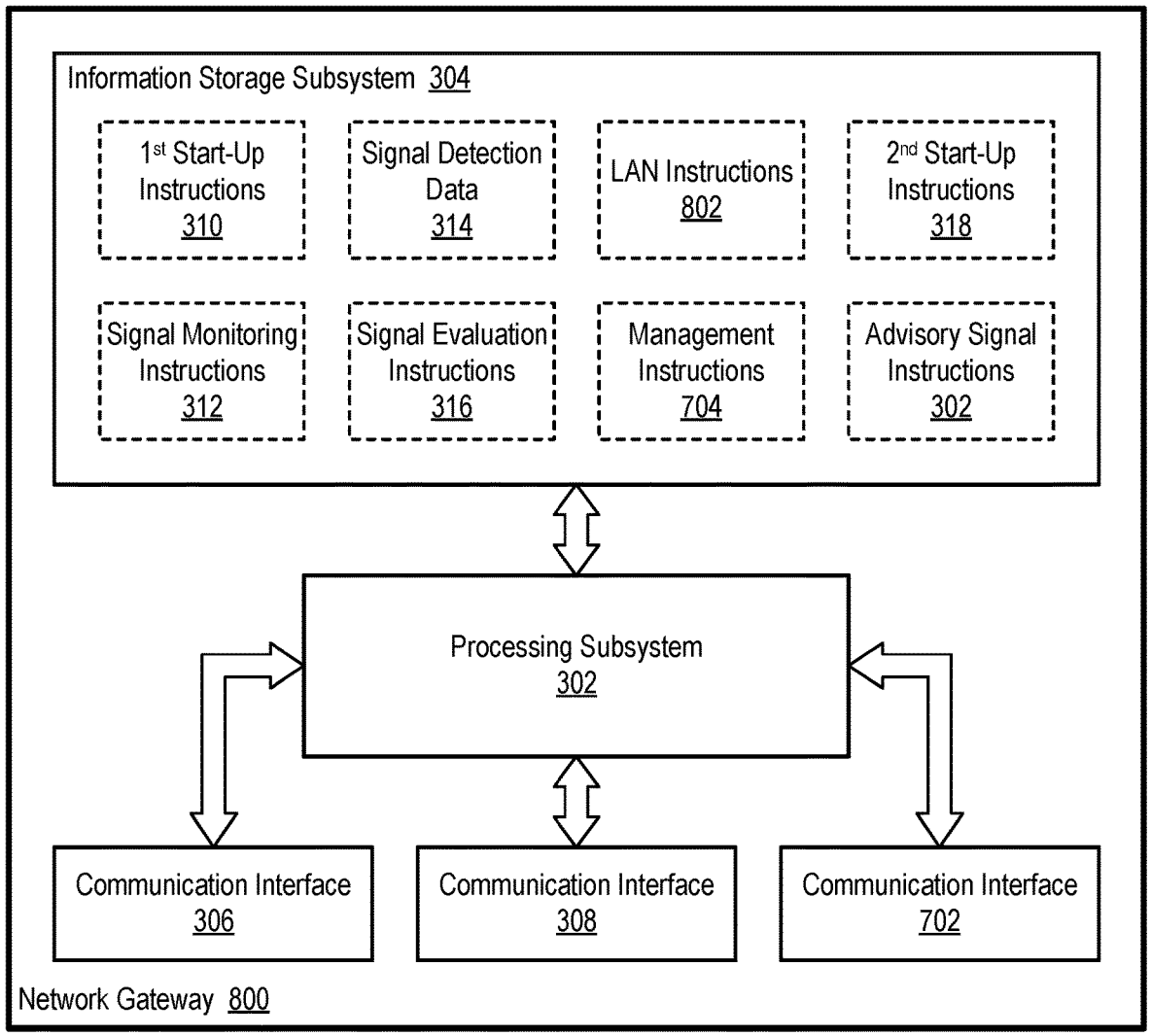
FIG. 8 is a block diagram of an alternate embodiment of the FIG. 7 termination device that is configured as a network gateway.

Any of the termination devices disclosed herein could include additional functionality such that the termination device is a network gateway. For example, FIG. 8 is a block diagram of a network gateway 800, which is an alternate embodiment of termination device 700 configured as a network gateway. Network gateway 800 includes all constituent elements of termination device 700 plus LAN instructions 802 stored in information storage subsystem 304. Processing subsystem 302 is configured to execute LAN instructions 802 to control a LAN encompassing communication devices communicatively coupled to communication interface 308 and/or communication interface 702. Examples of how processing subsystem 302 may control the LAN include, but are not limited to, one or more of routing traffic between network gateway 800 and communication devices communicatively coupled to communication interface 308 and/or 702, assigning of Internet Protocol (IP) addresses to communication devices, implementing access controls, such as parental controls, and/or supporting digital voice telephone service. While termination device functions and LAN control functions are performed by common elements in gateway 800, some alternate embodiments of gateway 800 include elements for performing LAN control that are separate from processing subsystem 302 and information storage subsystem 304. Certain embodiments of gateway 800 are configured to start a local LAN in parallel with performing a first start-up procedure.

Figure 9:
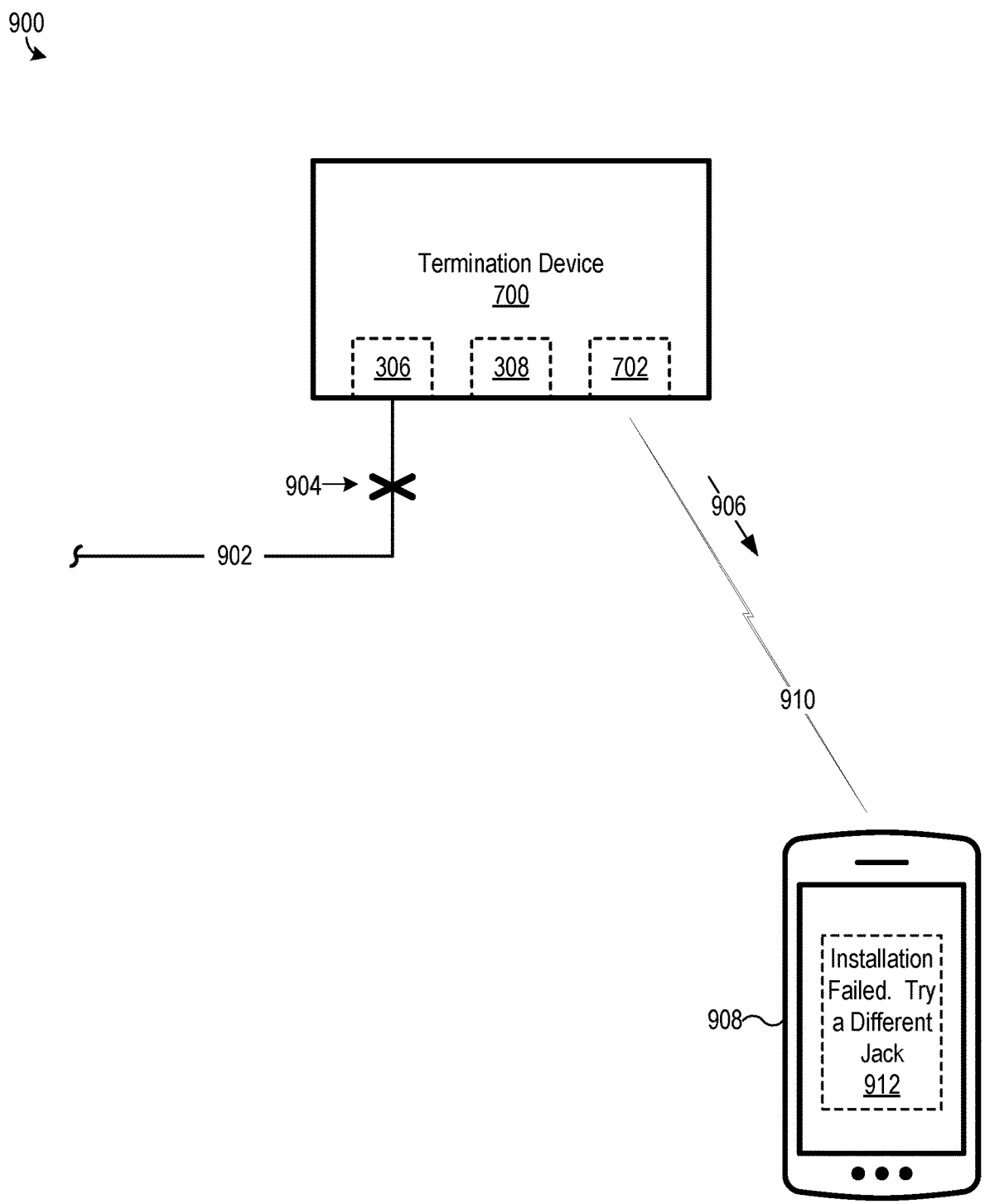
FIG. 9 is an illustration of an example of operation of the FIG. 7 termination device where installation fails, according to an embodiment.

FIG. 9 is an illustration of operation of termination device 700 in an example scenario where installation fails. It is understood, however, that termination device 700 is not limited to operating according to FIG. 9. Details of termination device 700 are not shown in FIG. 9. In the FIG. 9 example scenario, a subscriber is attempting to install termination device 700 via a wireline or wireless connection 902 to an access communication network using communication interface 306. However, a discontinuity 904 in connection 902, such as a disconnected cable, a damaged cable, or a missing cable, or from an obstructed wireless transceiver, prevents access communication signals from reaching communication interface 306. As such, installation of termination device 700 fails, and termination device 700 therefore sends an advisory signal 906 to a communication or display device such as a mobile phone 908 in the vicinity of termination device 700, where advisory signal 906 indicates installation failure. Termination device 700 sends advisory signal 906 to mobile phone 908 via wireless communication signals 910, and in some embodiments, wireless communication signals 910 are Bluetooth wireless communication signals or Wi-Fi wireless communication signals. Mobile telephone 908 displays a message 912 in response to receipt of advisory signal 906, where message 912 advises that installation of termination device 700 has failed and suggests that the subscriber (or other party performing the installation) try a different jack or take another action. In some embodiments, message 912 is a Short Message Service (SMS) message, a Multimedia Message Service (MMS) message, or a message generated by an application or "app" installed on mobile telephone 908.

Figure 10:
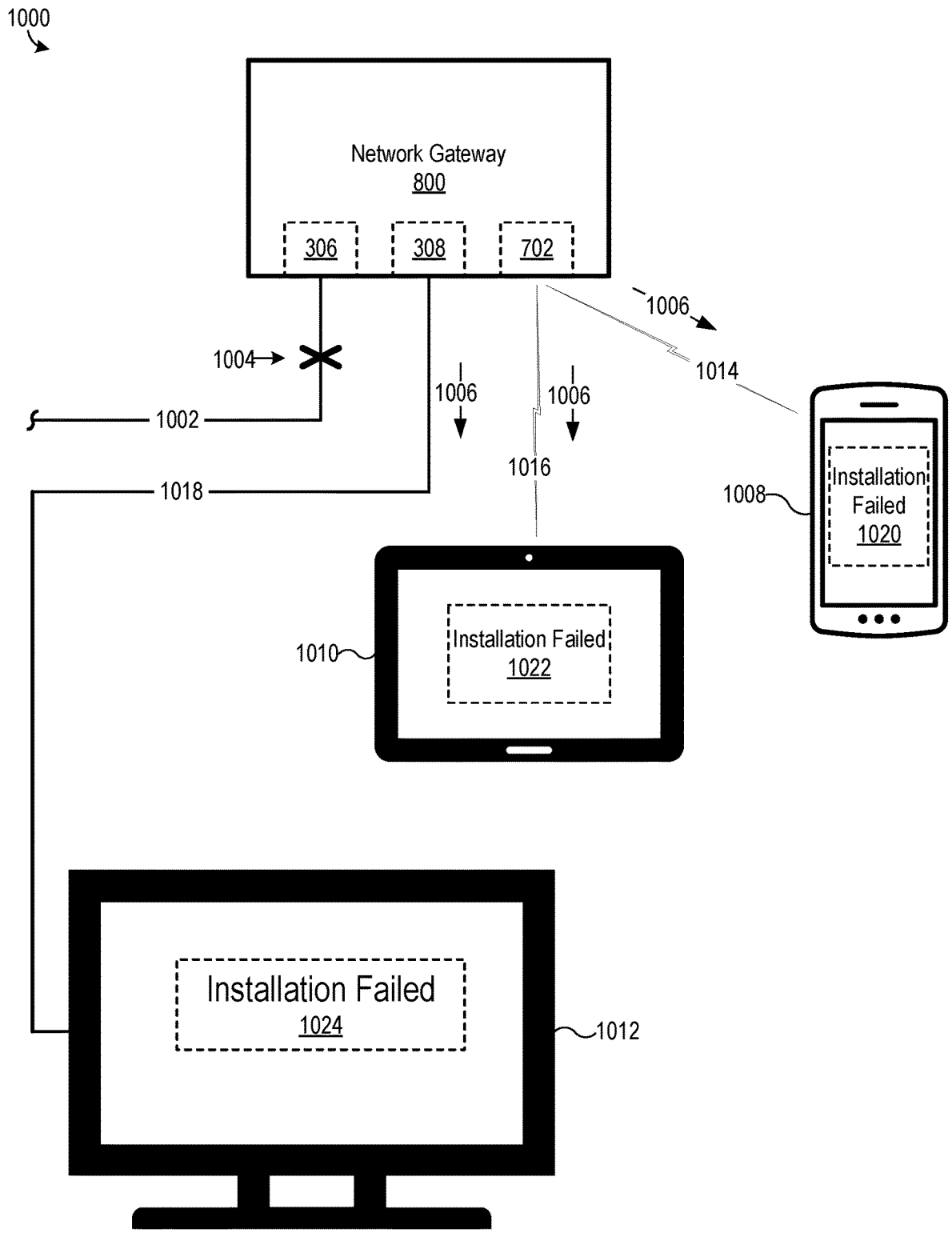
FIG. 10 is an illustration of an example of operation of the FIG. 8 network gateway where installation fails, according to an embodiment.

FIG. 10 is an illustration of one example of operation of network gateway 800 in an example scenario where installation fails. It is understood, however, that network gateway 800 is not limited to operating according to FIG. 10. Details of network gateway 800 are not shown in FIG. 10. In the FIG. 10 example scenario, a subscriber is attempting to install network gateway 800 via a wireline or wireless connection 1002 to an access communication network using communication interface 306. However, a discontinuity 1004 in connection 1002, such as a disconnected cable, a damaged cable, or a missing cable, or from an obstructed wireless transceiver, prevents access communication signals from reaching communication interface 306. As such, installation of network gateway 800 fails, and network gateway 800 therefore sends an advisory signal 1006 advising of the installation failure to one or more communication devices communicatively coupled thereto, i.e., to a mobile phone 1008, a tablet computer 1010, and a smart television 1012. Gateway 800 sends advisory signal 1006 to mobile phone 1008 and table computer 1010 via wireless communication signals 1014 and 1016, respectively, using communication interface 702. In some embodiments, wireless communication signals 1014 and 1016 utilize the unlicensed spectrum such as Bluetooth wireless communication signals or Wi-Fi wireless communication signals. In some alternate embodiments, however, mobile phone 1008 and/or tablet computer 1010 are communicatively coupled to communication interface 702 via a wired communication link or a hybrid or converged wired and wireless communication link. Gateway 800 sends advisory signal 1006 to smart television 1012 via a hardwired connection 1018 using communication interface 308, and in some embodiments, hardwired connection 1018 includes an electrical cable or an optical cable. Mobile telephone 1008, tablet computer 1010, and smart television 1012 generate respective messages 1020, 1022, and 1024 advising that installation failed, in response to receipt of advisory signal 1006.

Figure 11:
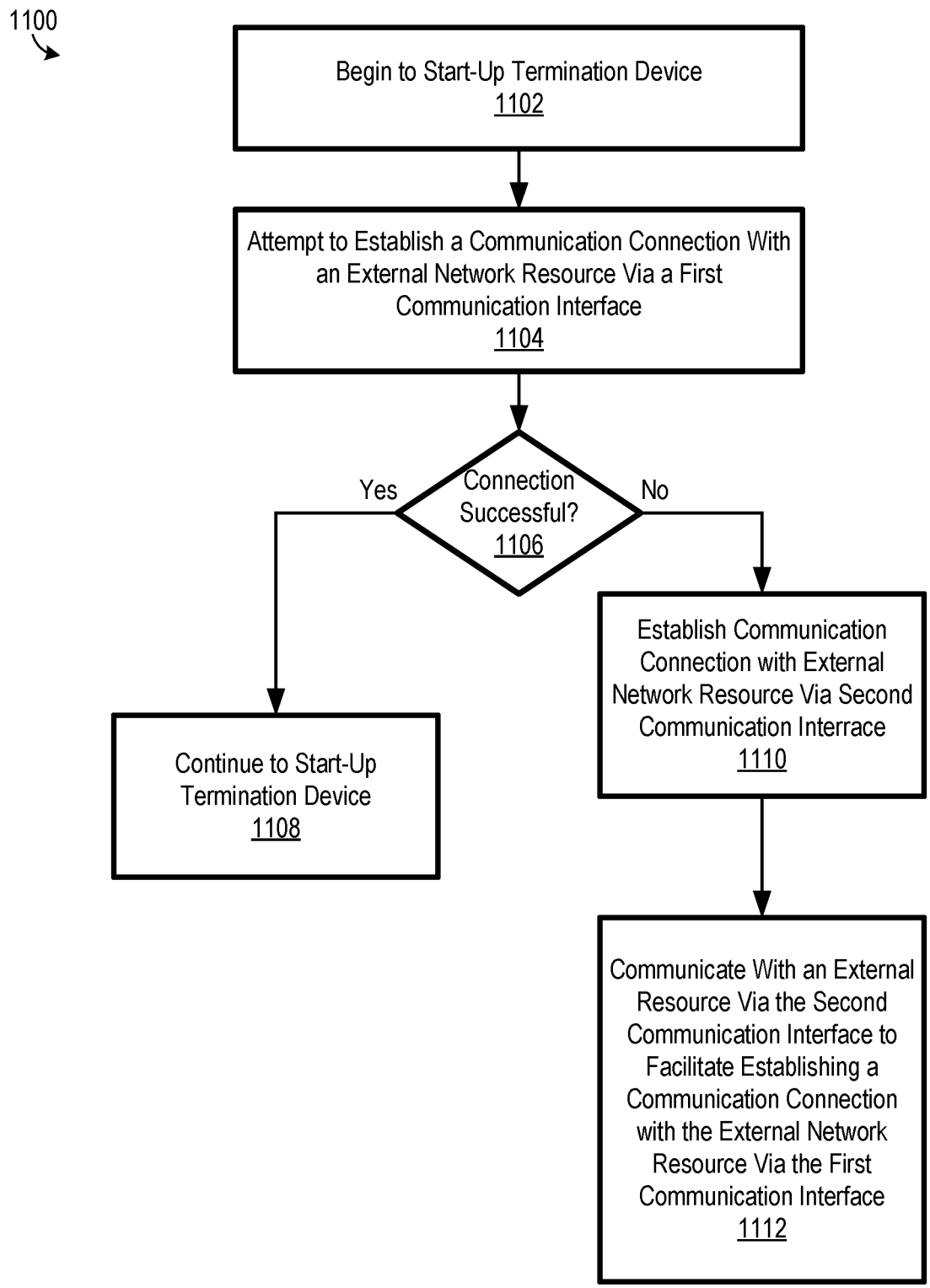
FIG. 11 is a flow chart illustrating another method for operating a termination device of an access communication network, according to an embodiment.

Some embodiments of the termination devices disclosed herein are configured to communicate with external network resources via a second communication interface in event of a problem associated with a first communication interface, such as to facilitate troubleshooting of the first communication interface or to provide temporary communication service via the second communication interface. For example, FIG. 11 is flow chart of a method 1100 for operating a termination device of an access communication network, which is another embodiment of the new methods disclosed herein. While method 1100 is primarily discussed below with respect to termination device 700, method 1100 is not limited to use with termination device 700. Additionally, termination device 700 need not operate according to method 1100.

In a block 1102 of method 1100, the termination device begins to start-up. In one example of block 1102, processing subsystem 302 begins to execute first start-up instructions 310 to begin starting-up termination device 700. In a block 1104, the termination device attempts to establish a communication connection with an external network resource via a first communication interface. In one example of block 1104, processing subsystem 302 continues to execute first start-up instructions 310 to attempt to establish a communication connection with a resource of an access communication network via communication interface 306. Method 1100 proceeds from block 1104 to a decision block 1106 where the termination device determines whether it was able to establish the communication connection in block 1104. In one example of block 1106, processing subsystem 302 further executes first start-up instructions 310 to determine whether the attempt to establish the communication connection via communication interface 306 was successful. If the result of decision block 1106 is yes, method 1100 proceeds to block 1108 where the termination device continues to start-up. In one example of block 1108, processing subsystem 302 executes second start-up instructions 318 to continue to start-up termination device 700.

On the other hand, if the result of decision block 1106 is no, i.e., the termination device was unable to establish a communication connection with the external network resource via the first communication interface, method 1100 proceeds to a block 1110 where the termination device establishes a communication connection with the external network resource via a second communication interface. Such communication connection may be referred to as a back communication channel. In one example of block 1110, processing subsystem 302 continues to execute first start-up instructions 310 to establish a communication connection with the resource of the access communication network via communication interface 308. In a block 1112 of method 1100, the termination device communicates with the external network resource via the second communication interface to facilitate establishing a communication connection with the external network resource via the first communication interface, or in other words, to attempt to resolve the problem with the first communication interface. In one example of block 1112, processing subsystem 302 executes management instructions 704 to communicate with the resource of the access communication network via communication interface 308, to facilitate resolving the problem with communication interface 306.

The communication of block 1112 can take a variety of forms. For example, the termination device may establish a communication connection through the second communication interface to the external network resource to load a standard operating system image for the termination device or to load a special troubleshooting operating system image for the termination device, where the special operating system image may be a smaller or larger than the standard operating system image, depending on a desired troubleshooting approach and access communication network limitations. There may be two-way communication between the termination device and a resource of the access communication network, such as to provide fault codes or logs describing the problem to the access communication network, so that proper action can be taken to resolve the problem. An operating system image sent by the access communication network to the termination device can contain special steps in a special start-up procedure to help troubleshoot the problem with the first communication interface, or to help set up routing to use the second communication interface, for management and/or for customer traffic, such as to share telemetry, to enable additional remote troubleshooting, and/or to provide communication service to the subscriber until the problem with the first communication interface is fixed.

In some embodiments, the access communication network may fully provision communication service to the termination device, e.g., by loading a full operating system image, but with the second communication interface configured to carry all traffic. A troubleshooting operating system image may also add additional troubleshooting and telemetry capabilities to better determine the cause of the problem with the first communication interface and to assist with provisioning of the termination device despite the first communication interface being non-functional. The troubleshooting operating system image may perform such functions in steps whereby functionality is added via software modules.

The access communication network may interpret a request to use the secondary communication interface for provisioning to mean that the first communication interface is not working as intended, and the access communication network may therefore send a first functional configuration to the termination device via the second communication interface, where the first functional configuration makes needed adjustments to optimize communication service for the subscriber based on this first functional configuration. The first functional configuration may also add troubleshooting information and monitoring functions, such as to watch for recovery of a communication connection established using the first communication interface. The termination device may also be configured to directly indicate to external network resources via the second communication interface that the termination device is unable to establish a communication connection with the external network resource via the first communication interface.

In some embodiments, the termination system provides information to the access communication network in one or more of the following forms, to aid troubleshooting of the first communication interface: logs, proactive network management (PNM) tests including spectrum capture, wireless channel data, and other details to help determine an impairment and its location in the access communication network and its associated infrastructure. For example, low radio frequency (RF) energy may indicate a poor connection, whereas no RF energy or only RF energy that appears to be from ingress would indicate no connection or a severely poor connection. Furthermore, in some embodiments, the termination system can determine a location of a fault in a connection to the first communication interface by using time domain reflectometry, i.e., by sending a pulse out of the first communication interface and determining how long it takes for the first communication interface to receive an associated return pulse. In some embodiments, the termination device and/or the access communication network can determine what type of fix is required at least partially based on test data from the termination device. For example, if time domain reflectometry indicates that a fault is within the subscriber's premises, a technician can be automatically dispatched to the subscriber's premises to repair the fault. On the other hand, if time domain reflectometry indicates that a fault is outside of the subscriber's premises, a truck roll can be automatically scheduled to repair the access communication network infrastructure.

Furthermore, in some embodiments, the access communication network provides to the termination device, via the second communication interface, an alternative operating system image that is robust to the situation but is also functional for an overall intended service once established fully, and to issue a general process for resolving a provisioning failure. The termination device consequently will then be ready for when service via the first communication interface is restored, and the proper action to restore service via the first communication interface can then take place as a repair. Information about the aforesaid alternative provisioning can be shared with a subscriber or other party in the vicinity of the termination device via user equipment, such as in a manner similar to that illustrated above with respect to FIGS. 9 and 10.

Moreover, in some embodiments, the termination device and the external network resources may establish a communication channel therebetween, such as to enable a party installing the termination device to communicate with an access network operator, to facilitate solving the problem with the first communication interface. Additionally, the termination device may communicate with the external network resource for purposes other than problem solving, such as for provisioning the termination device. Furthermore, the termination device may communicate with the external network resource to resolve one or more problems not related to the first communication interface, such as a problem with Wi-Fi communication supported by the termination device.

Method 1100 can be adapted to take advantage of additional communication interfaces. For example, if termination device 700 is unable to establish a communication connection with an external network resource via either of communication interfaces 306 and 308, termination device 700 may execute blocks 1110 and 1112 of method 1100 using communication interface 700, instead of communication interface 308. Additionally, the concept of establishing a communication connection to an external network resource via an alternative communication interface when the primary communication interface is unavailable is not limited to use with termination devices configured to identify lack of an adequate access communication signal early in a start-up procedure.

Figure 12:
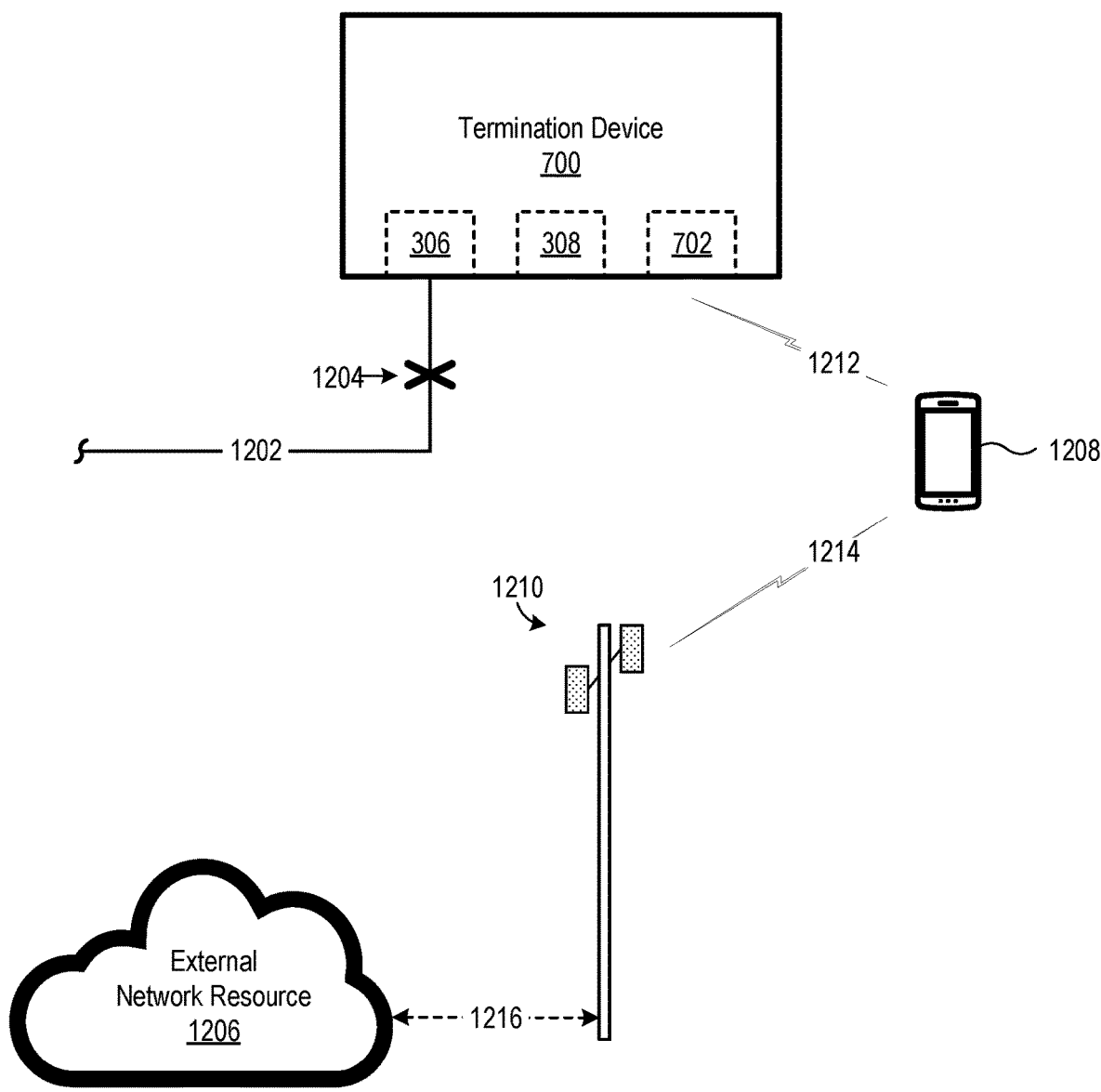
FIG. 12 is an illustration of one example of execution of the FIG. 11 method with the FIG. 7 termination device, according to an embodiment.

FIG. 12 is an illustration of one example of execution of method 1100 with termination device 700. It is understood, however, that termination device 700 is not limited to operating according to this example, as well as that method 1100 can be executed with other termination devices. In the FIG. 12 example, a subscriber or other party is attempting to install termination device 700 via a wireline connection 1202 to an access communication network using communication interface 306. However, a discontinuity 1204 in wireline connection 1202, such as a disconnected cable, a damaged cable, or a missing cable, prevents access communication signals from reaching communication interface 1206. As such, termination device 700 is unable to establish a communication connection with an external network resource 1206 via communication interface 306. External network resource 1206 is associated with the access communication network and includes, for example, a termination device provisioning entity and/or a troubleshooting entity. External network resource 1206 may also include the public Internet, content services, communication services, etc.

In response to failure to establish a communication connection to external network resource 1206 using communication interface 306, termination device 700 instead establishes a communication connection to external network resource 1206 using communication interface 702, via a mobile phone 1208 and a cellular communication network 1210. In particular, termination device 700 communicates with mobile phone 1208 using communication interface 702 via wireless communication signals 1212, and in some embodiments, wireless communication signals 1212 are Wi-Fi wireless communication signals or Bluetooth wireless communication signals. Mobile phone 1208 in turn communicates with cellular communication network 1210 via cellular wireless communication signals (e.g., using a 3GPP protocol or a non-3GPP protocol), and cellular communication network 1210 communicates with external network resource 1206 via a logical communication link 1216. Termination device 700 then communicates with external network resource 1206 via network interface 702, mobile phone 1208, and cellular communication network 1210 for one or more of the purposes discussed above with respect to FIG. 11, such as to download an operating system image for termination device 700, to troubleshoot the failure to establish a communication connection using communication interface 306, and/or to establish a temporary communication connection between external network resource 1206 and termination device 700.

Figure 13:
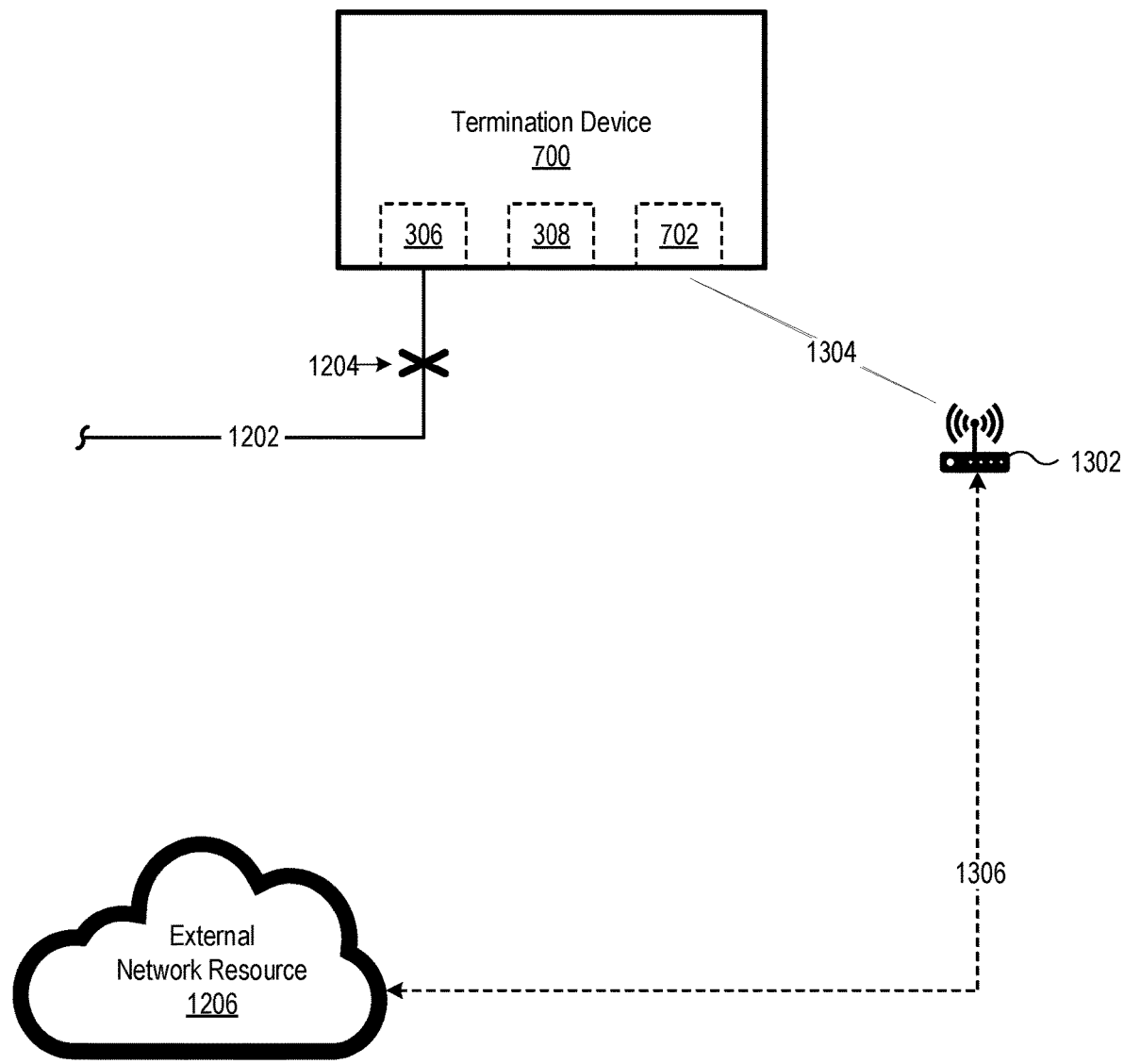
FIG. 13 is an illustration of another example of execution of the FIG. 11 method with the FIG. 7 termination device, according to an embodiment.

FIG. 13 is an illustration of another example of execution of method 1100 with termination device 700. The FIG. 13 example is like the FIG. 12 example except that termination device 700 establishes a communication link to external network resource 1206 via communication interface 1302 and Wi-Fi access point 1302 in response to failure to establish a communication connection to external network resource 1206 using communication interface 306. In particular, termination device 700 communicates with Wi-Fi access point 1302 via Wi-Fi wireless signals 1304, and Wi-Fi access point 1302 communicates with external network resource 1206 via a logical communication link 1306. In some embodiments, Wi-Fi access point 1302 is associated with the access communication network. For example, Wi-Fi access point 1302 may be a public Wi-Fi hotspot of the access communication network, or Wi-Fi access point 1302 may be part of a network gateway connected to the access communication network at another subscriber's premises.

Figure 14:
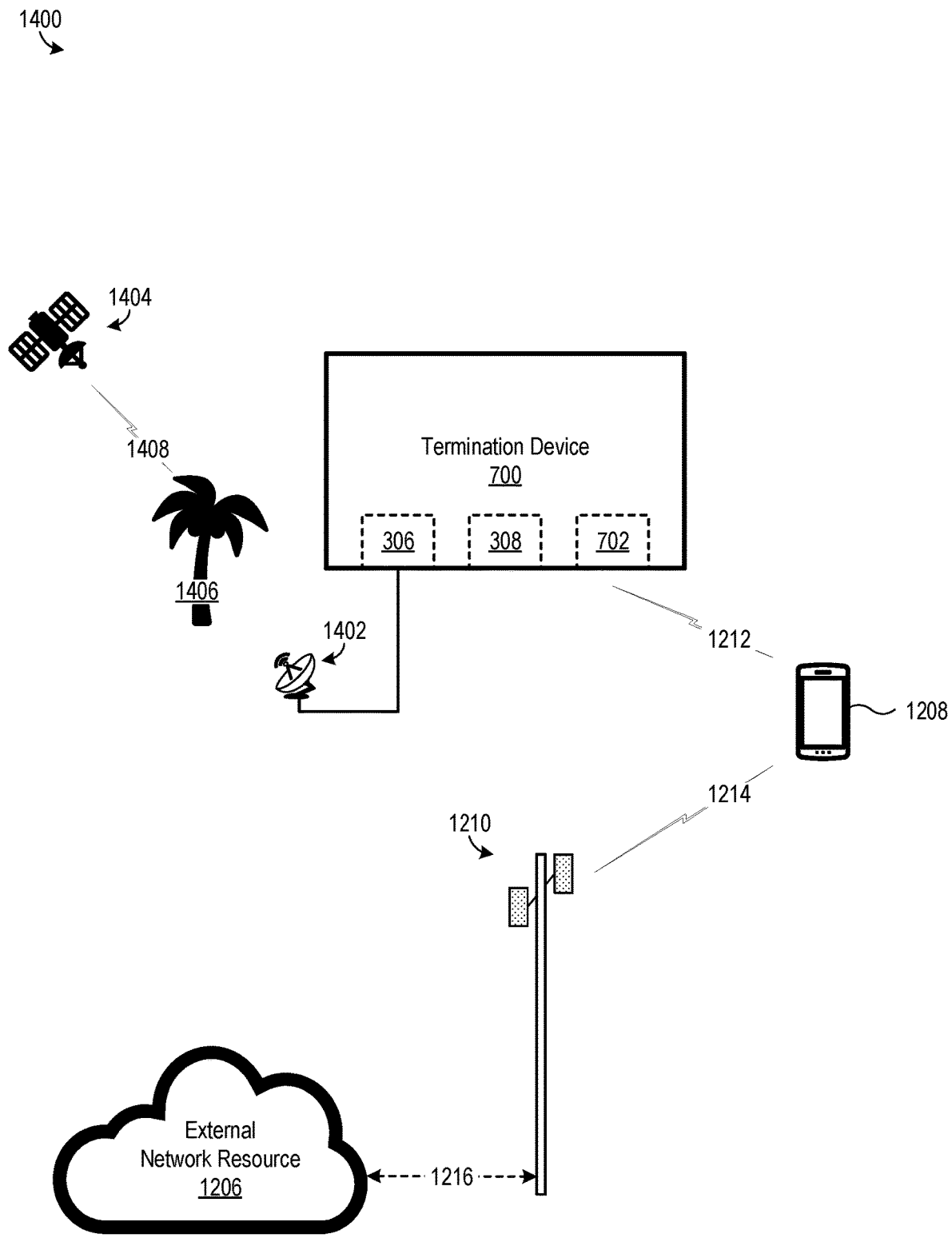
FIG. 14 is an illustration of an additional example of execution of the FIG. 11 method with the FIG. 7 termination device, according to an embodiment.

FIG. 14 is an illustration of another example of execution of method 1100 with termination device 700. The FIG. 14 example is like the FIG. 12 example except that termination device 700 first attempts to establish a communication connection to external network resource 1206 via a satellite transceiver 1402 and a satellite access communication network 1404. A tree 1406 blocks transmission of wireless communication signals 1408 between satellite access communication network 1404 and satellite transceiver 1402, and termination device 700 therefore fails to establish a communication connection using communication interface 306. In response, termination device 700 establishes a secondary communication connection to external network resource 1206 via communication interface 702, mobile phone 1208, and cellular communication network 1210, in the same manner as discussed above with respect to FIG. 12.

Figure 15A:
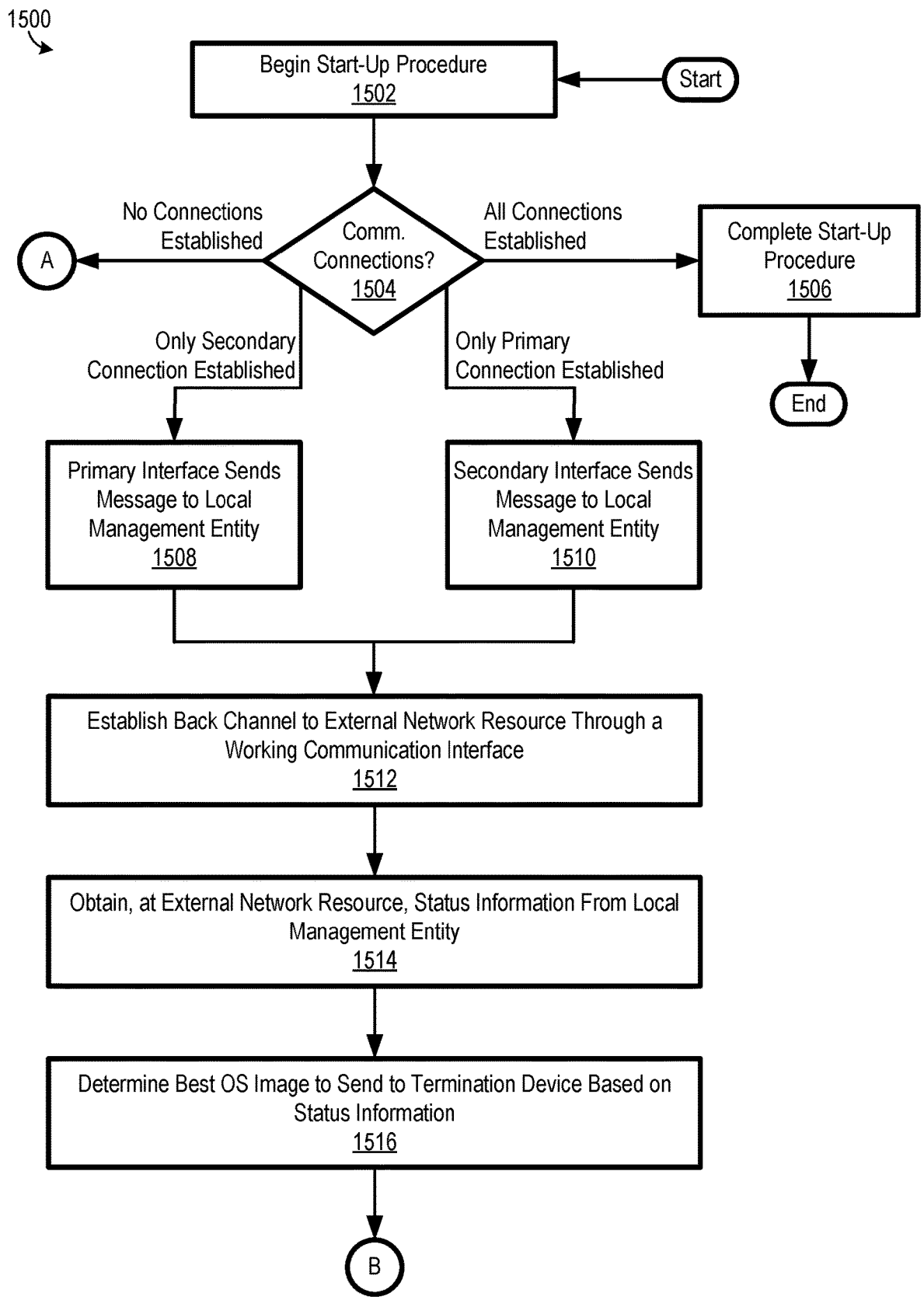
FIGS. 15A-15C are a flow chart of another method for operating a termination device of an access communication network, according to an embodiment.
Figure 15B:
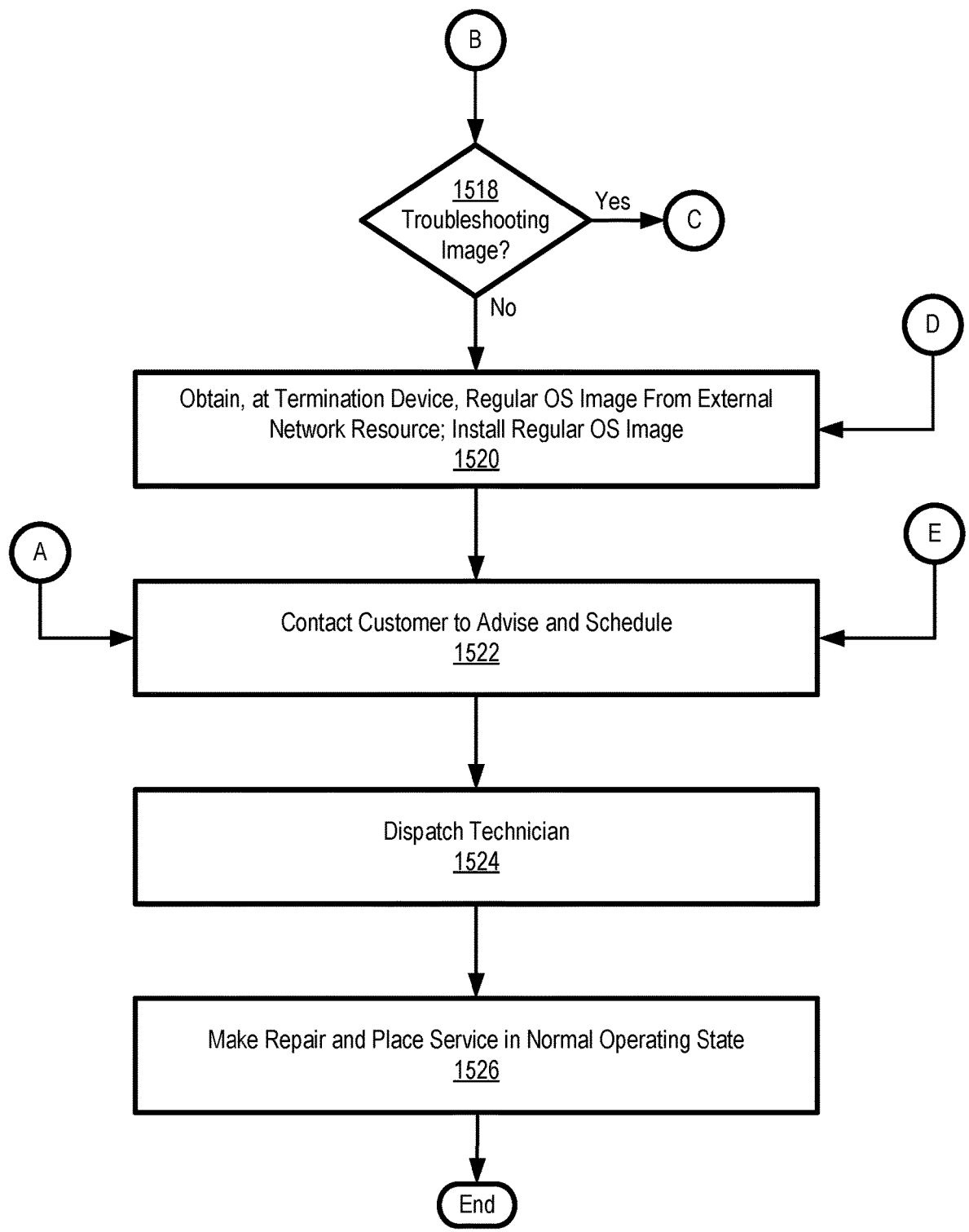
Figure 15C:
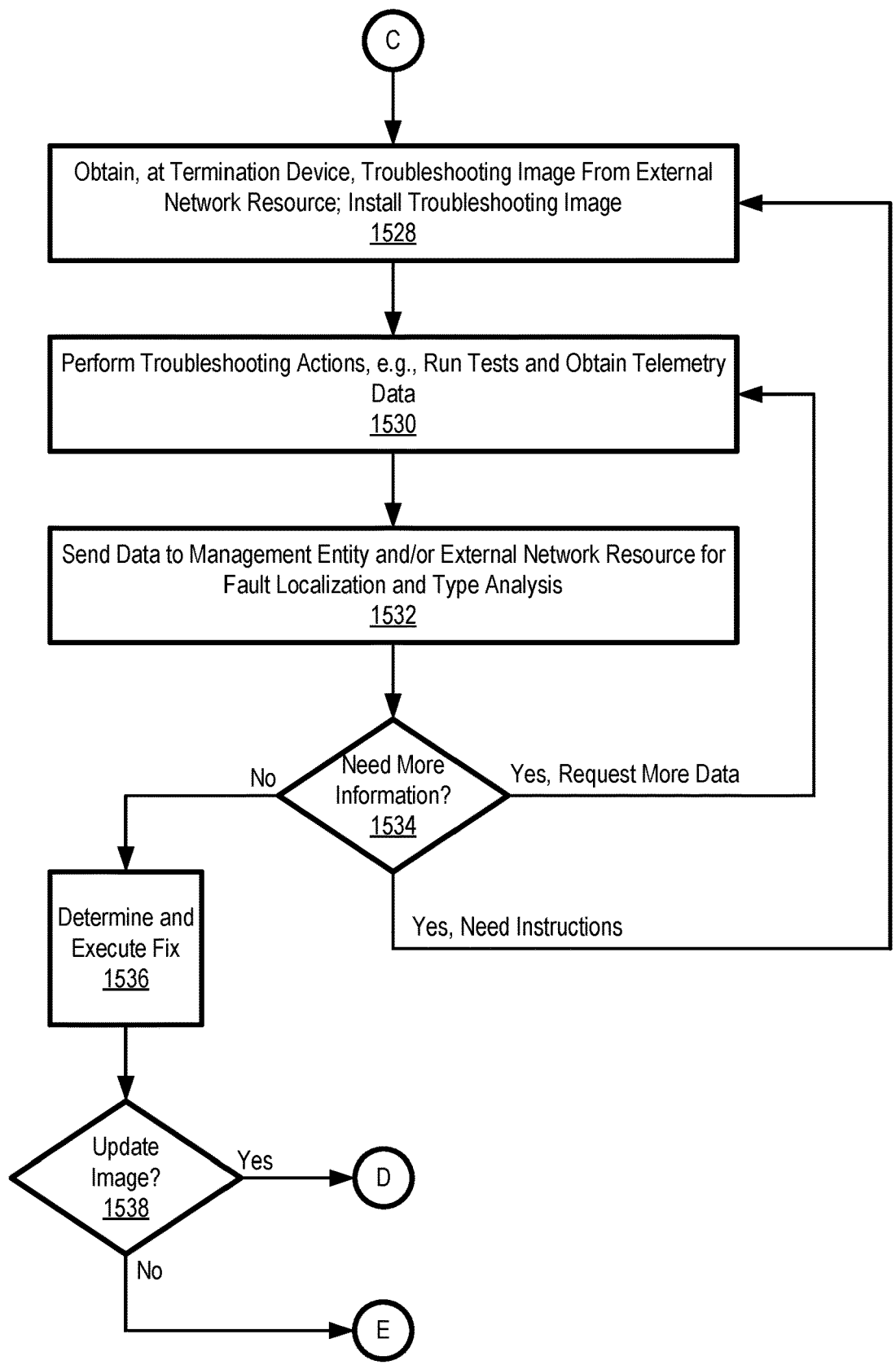

FIGS. 15A-15C are a flow chart 1500 of another method for operating a termination device of an access communication network. While method 1500 is primarily discussed below with respect to termination device 700, method 1500 is not limited to use with termination device 700. Additionally, termination device 700 is not limited to operating according to method 1500.

In a block 1502, the termination device begins a start-up procedure. In one example of block 1502, processing subsystem 302 begins to execute first start-up instructions 310 to begin starting-up termination device 700 and attempt to establish communication connections to an external network resource at least via communication interfaces 306 and 308. In a decision block 1504, the termination device determines what, if any, communication connections were established. If all communication connections were established, e.g., communication connections were established to the external network resource via both of communication interfaces 306 and 308, method 1500 proceeds to block 1506 where the termination device completes the start-up procedure. In one example of block 1506, processing subsystem 302 executes second start-up instructions 318 to complete start-up of termination device 700.

On the other hand, if only a secondary communication connection is established, e.g., a communication connection is established to the external network resource solely via communication interface 308, method 1500 proceeds from decision block 1504 to a block 1508. In contrast, if only a primary communication connection is established, e.g., a communication connection is established to the external network resource solely via communication interface 306, method 1500 proceeds from decision block 1504 to block 1510. In block 1508, the primary communication interface sends a message to a local management entity of the termination device advising of failure to establish a primary communication connection. In one example of block 1508, communication interface 306 sends a message to a local management entity instantiated by processing subsystem 302 executing management instructions 704 advising that communication interface 306 failed to establish a primary communication connection. In block 1510, the secondary communication interface sends a message to a local management entity of the termination device advising of failure to establish a secondary communication connection. In one example of block 1510, communication interface 308 sends a message to a local management entity instantiated by processing subsystem 302 executing management instructions 704 advising that communication interface 308 failed to establish a secondary communication connection.

Each of blocks 1508 and 1510 proceeds to a block 1512 where the termination device establishes a back communication channel to the external network resource using a working communication interface, where the working communication interface is whichever communication interface that was successful in establishing a communication connection. In one example of block 1512, termination device 700 establishes a back communication channel to the external network resource using communication interface 308. In a block 1514 of method 1500, the external network resource obtains status information (e.g., logs or error codes) from the local management entity. In one example of block 1514, the external network resource obtains, from a management entity instantiated by processing subsystem 302, information indicating failure to establish a primary communication connection using communication interface 306. In a block 1516 of method 1500, the external network resource determines a best operating system (OS) image to send to the termination device based on the status information obtained in block 1514. In one example of block 1516, the external network resource determines to send a troubleshooting operating system image to termination device 700, in view of status information indicating failure to establish a primary communication connection.

Block 1516 proceeds to a decision block 1518 (FIG. 15B) where the external network resource determines whether the best operating system image determined in block 1516 includes a troubleshooting operating system image. If the result of decision block 1518 is no, method 1500 proceeds to a block 1520 where the termination device obtains, via the back communication channel established in block 1512, a functional operating system image from the external network resource, and the termination device installs the functional operating system image. In one example of block 1520, a local management entity instantiated by processing subsystem 302 obtains a functional operating system image via communication interface 308, and the local management entity installs the functional operating system image in termination device 700. In a block 1522, an affiliate of the access communication network, or an automated system of the external network resource, contacts the subscriber to advise that there is a connectivity problem and to schedule a technician visit to the subscriber's premises. A technician is then dispatched to the subscriber's premises in a block 1524, and in a block 1526, the technician makes the necessary repairs and places the termination device in a normal operating state.

If the result of decision block 1518 is yes, i.e., the determined operating system image includes a troubleshooting operating system image and optionally further includes a functional operating system image, method 1500 proceeds to a block 1528 where the termination device obtains, via the back communication channel established in block 1512, a troubleshooting operating system image from the external network resource, and the termination device installs the troubleshooting operating system image. In one example of block 1528, a local management entity instantiated by processing subsystem 302 obtains a troubleshooting operating system image via communication interface 308, and the local management entity installs the troubleshooting operating system image in termination device 700.

In a block 1530 of method 1500, the termination device performs one or more troubleshooting actions, such as running tests and/or obtaining telemetry data, to help troubleshoot the problem with the primary communication interface. In one example of block 1530, a management entity instantiated by processing subsystem 302 performs one or more troubleshooting actions to help detect a problem associated with communication interface 306. In a block 1532 of method 1500, data generated from the troubleshooting action(s) performed in block 1530 is sent to a local management entity and/or the external network resource for determining fault type and location. In one example of block 1530, termination device 700 sends troubleshooting data to an external network resource associated with an access communication network to help determine a type and location of a fault causing the problem with communication interface 306.

In a decision block 1534, method 1500 determines whether more information is needed to diagnose the problem associated with the primary communication interface. If the result of decision block 1534 is that more instructions are needed, method 1500 returns to block 1528 to obtain additional instructions from the troubleshooting operating system image. If the result of decision block 1534 is that more data is needed, method 1500 returns to block 1530 to perform additional troubleshooting and thereby obtain additional data. On the other hand, if the result of decision block 1534 is no, method proceeds to a block 1536 where a fix to the problem associated with the primary communication interface is determined and executed. Block 1536 is executed, for example, by the termination device and/or by the external network resource.

Method 1500 proceeds from block 1536 to a decision block 1538 where the method determines whether an updated operating system image is needed for the termination device. If yes, method 1500 proceeds to block 1520, and if no, method 1500 proceeds to block 1522. Additionally, referring again to FIG. 15C, if the result of decision block 1504 is that no communication connections are established, method 1500 proceeds from decision block 1504 to block 1522 of FIG. 15B.

COMBINATIONS OF FEATURES

Features described above may be combined in various ways without departing from the scope hereof. The following examples illustrate some possible combinations.

(A1) A method for operating a termination device of an access communication network includes (1) performing, at the termination device, a first start-up procedure, (2) after performing the first start-up procedure, detecting, at the termination device, presence of a communication signal meeting one or more predetermined criteria, and (3) in response to detecting presence of the communication signal meeting the one or more predetermined criteria, performing, at the termination device, a second start-up procedure that is different from the first start-up procedure.

(A2) In the method denoted as (A1), performing the first start-up procedure may require a first amount of time, and performing the second start-up procedure may require a second amount of time that is greater than the first amount of time.

(A3) In either one of the methods denoted as (A1) and (A2), the first start-up procedure may include storing first data in an information storage subsystem of the termination device, and the second start-up procedure may be at least partially based on the first data.

(A4) In any one of the methods denoted as (A1) through (A3), the second start-up procedure may include one or more security steps that are not present in the first start-up procedure.

(A5) In any one of the methods denoted as (A1) through (A4), the one or more predetermined criteria may include at least one of (1) the communication signal having one or more predetermined frequency characteristics, (2) the communication signal having one or more predetermined amplitude characteristics, (3) the communication signal having one or more predetermined modulation characteristics, (4) the communication signal having one or more predetermined stability characteristics, (5) the communication signal having one or more predetermined communication protocol characteristics, (6) the communication signal representing one or more predetermined items of information, (7) the communication signal having a predetermined or determinable pattern, (8) the communication signal having one or more predetermined distortion characteristics, (9) the communication signal having one or more predetermined harmonic content characteristics, (10) the communication signal having a predetermined phase, and (11) the communication signal being decodable to yield predetermined data.

(A6) In any one of the methods denoted as (A1) through (A5), the termination device may include a modem.

(A7) In the method denoted as (A6), the modem may be one of a cable modem, a digital subscriber line (DSL) modem, and a wireless modem.

(A8) In any one of the methods denoted as (A1) through (A5), the termination device may include an optical network terminal.

(A9) Any one of the methods denoted as (A1) through (A8) may further include powering the termination device from an energy storage subsystem internal to the termination device at least while performing the first start-up procedure.

(A10) Any one of the methods denoted as (A1) through (A9) may further include starting a local area network while performing the first start-up procedure.

(A11) In any one of the methods denoted as (A1) through (A10), one or more of the first start-up procedure and the second start-up procedure may include partially or fully provisioning the termination device.

(B1) A method for operating a termination device of an access communication network includes (1) determining that the termination device is unable to establish a communication connection with an external network resource via a first communication interface of the termination device, (2) in response to determining that the termination device is unable to establish a communication connection with the external network resource via the first communication interface, establishing a communication connection with the external network resource via a second communication interface of the termination device, and (3) communicating with the external resource via the second communication interface to facilitate establishing a communication connection with the external network resource via the first communication interface.

(B2) In the method denoted as (B1), communicating with the external resource via the second communication interface may include receiving an operating system image for the termination device from the external network resource via the second communication interface.

(B3) In either one of the methods denoted as (B1) and (B2), communicating with the external resource via the second communication interface may include receiving a troubleshooting operating system image for the termination device from the external network resource via the second communication interface.

(B4) In any one of the methods denoted as (B1) through (B3), communicating with the external network resource via the second communication interface may include providing information describing a problem with the first communication interface to the external network resource via the second communication interface.

(B5) In any one of the methods denoted as (B1) through (B4), communicating with the external network resource via the second communication interface may include facilitating a communication channel between a party associated with termination device and a party associated with the external network resource.

(B6) Any one of the methods denoted as (B1) through (B5) may further include sending, to a communication device external to the termination device, a signal indicating that the termination device is unable to establish a communication connection with the external network resource via the first communication interface.

(B7) In the method denoted as (B6), the communication device external to the termination device may include user equipment (UE).

(C1) A method for operating a termination device of an access communication network includes (1) performing, at the termination device, a first start-up procedure, (2) after performing the first start-up procedure, determining, at the termination device, lack of presence of a communication signal meeting the one or more predetermined criteria, and (3) in response to determining lack of presence of a communication signal meeting the one or more predetermined criteria, sending a first signal to user equipment (UE) external to the termination device.

(C2) In the method denoted as (C1), the first signal may indicate that the termination devices is unable to receive a communication signal meeting the one or more predetermined criteria.

(C3) In either one of the methods denoted as (C1) and (C2), sending the first signal to the user equipment UE may include sending the first signal to the UE via a wireless communication interface of the termination device.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for operating a termination device of an access communication network, the method comprising:
    performing, at the termination device, a first start-up procedure, the first start-up procedure including loading a first portion of an operating system of the termination device;
    after performing the first start-up procedure, detecting, at the termination device, presence of a communication signal meeting one or more predetermined criteria; and
    in response to detecting presence of the communication signal meeting the one or more predetermined criteria, performing, at the termination device, a second start-up procedure that is different from the first start-up procedure, the second start-up procedure including loading a second portion of the operating system of the termination device.

2. The method of claim 1, wherein:
    performing the first start-up procedure requires a first amount of time; and
    performing the second start-up procedure requires a second amount of time that is greater than the first amount of time.

3. The method of claim 1, wherein:
    the first start-up procedure comprises storing first data in an information storage subsystem of the termination device; and
    the second start-up procedure is at least partially based on the first data.

4. The method of claim 1, wherein the second start-up procedure comprises one or more security steps that are not present in the first start-up procedure.

5. The method of claim 1, wherein the one or more predetermined criteria comprise at least one of (a) the communication signal having one or more predetermined frequency characteristics, (b) the communication signal having one or more predetermined amplitude characteristics, (c) the communication signal having one or more predetermined modulation characteristics, (d) the communication signal having one or more predetermined stability characteristics, (e) the communication signal having one or more predetermined communication protocol characteristics, (f) the communication signal representing one or more predetermined items of information, (g) the communication signal having a predetermined or determinable pattern, (h) the communication signal having one or more predetermined distortion characteristics, (i) the communication signal having one or more predetermined harmonic content characteristics, (j) the communication signal having a predetermined phase, and (k) the communication signal being decodable to yield predetermined data.

6. The method of claim 1, wherein the termination device comprises a modem.

7. The method of claim 6, wherein the modem is selected from the group consisting of a cable modem, a digital subscriber line (DSL) modem, and a wireless modem.

8. The method of claim 1, wherein the termination device comprises an optical network terminal.

9. The method of claim 1, further comprising powering the termination device from an energy storage subsystem internal to the termination device at least while performing the first start-up procedure.

10. The method of claim 1, further comprising starting a local area network while performing the first start-up procedure.

11. A method for operating a termination device of an access communication network, the method comprising:
   determining that the termination device is unable to establish a communication connection with an external network resource via a first communication interface of the termination device;
   in response to determining that the termination device is unable to establish a communication connection with the external network resource via the first communication interface, establishing a communication connection with the external network resource via a second communication interface of the termination device; and
   communicating with the external resource via the second communication interface to facilitate establishing a communication connection with the external network resource via the first communication interface;
   wherein communicating with the external resource via the second communication interface comprises receiving an operating system image for the termination device from the external network resource via the second communication interface.

12. The method of claim 11, wherein the operating system image comprises a troubleshooting operating system image for the termination device.

13. The method of claim 11, wherein communicating with the external network resource via the second communication interface further comprises providing information describing a problem with the first communication interface to the external network resource via the second communication interface.

14. The method of claim 11, wherein communicating with the external network resource via the second communication interface further comprises facilitating a communication channel between a party associated with termination device and a party associated with the external network resource.

15. The method of claim 11, further comprising sending, to a communication device external to the termination device, a signal indicating that the termination device is unable to establish a communication connection with the external network resource via the first communication interface.

16. The method of claim 15, wherein the communication device external to the termination device comprises user equipment (UE).

* * * * *